(12) United States Patent
Park et al.

(10) Patent No.: US 11,128,713 B2
(45) Date of Patent: Sep. 21, 2021

(54) METHOD OF CONTROLLING EXTERNAL ELECTRONIC DEVICE AND ELECTRONIC DEVICE FOR SUPPORTING SAME

(71) Applicant: SAMSUNG ELECTRONICS CO., LTD., Suwon-si (KR)

(72) Inventors: Taejun Park, Suwon-si (KR); Minkyu Kim, Suwon-si (KR); Seunggyun Kim, Suwon-si (KR); Daeyoung Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/750,416

(22) Filed: Jan. 23, 2020

(65) Prior Publication Data

US 2020/0236176 A1 Jul. 23, 2020

(30) Foreign Application Priority Data

Jan. 23, 2019 (KR) .......................... 10-2019-0008781

(51) Int. Cl.
*G10L 15/22* (2006.01)
*G16Y 30/00* (2020.01)
(Continued)

(52) U.S. Cl.
CPC ............ *H04L 67/125* (2013.01); *G10L 15/22* (2013.01); *G10L 2015/223* (2013.01); *G16Y 30/00* (2020.01)

(58) Field of Classification Search
CPC .................................................... H04L 67/125
See application file for complete search history.

(56) References Cited

U.S. PATENT DOCUMENTS

| 2002/0177435 A1* | 11/2002 | Jenkins | ................. H04L 69/329 455/412.1 |
| 2014/0167931 A1* | 6/2014 | Lee | ..................... H04L 12/2818 340/12.5 |

(Continued)

FOREIGN PATENT DOCUMENTS

| KR | 10-2009-0084212 | 8/2009 |
| KR | 10-2017-0041601 | 4/2017 |

(Continued)

OTHER PUBLICATIONS

Girshick et al., "R-CNN for Object Detection", Oct. 3, 2014, 34 pages.

(Continued)

*Primary Examiner* — Joseph H Feild
*Assistant Examiner* — Pameshanand Mahase
(74) *Attorney, Agent, or Firm* — Nixon & Vanderhye P.C.

(57) ABSTRACT

Disclosed is an electronic device including: a communication circuit; a processor; and a memory, wherein the memory stores instructions which, when executed, cause the processor to control the electronic device to: acquire first information on types of objects disposed within a first space and second information on locations of the objects in a first direction, select a target object, generate first name of the target object based on information on a type of the target object in the first information, generate second name of at least one counterpart object based on information on a type of the counterpart object disposed around the target object in the first information, determine a relative location relation between the target object and the at least one counterpart object based on the second information, and generate third name of the target object based on the first name, the second name, and the relative location relation.

20 Claims, 25 Drawing Sheets

(51) Int. Cl.
  *G08C 23/04* (2006.01)
  *G08C 17/02* (2006.01)
  *H04L 29/08* (2006.01)

(56) References Cited

U.S. PATENT DOCUMENTS

| | | |
|---|---|---|
| 2015/0194152 A1 | 7/2015 | Katuri et al. |
| 2016/0380968 A1 | 12/2016 | Sarwar et al. |
| 2018/0228006 A1 | 8/2018 | Baker et al. |
| 2019/0005669 A1* | 1/2019 | Jiang .................. G06T 7/80 |
| 2020/0175961 A1* | 6/2020 | Thomson .............. G10L 15/063 |

FOREIGN PATENT DOCUMENTS

| | | | |
|---|---|---|---|
| KR | 10-2018-0130889 | 12/2018 | |
| KR | 20180130889 | * 12/2018 | ............. G10L 15/22 |

OTHER PUBLICATIONS

Santoro et al., "A simple neural network module for relational reasoning", DeepMind, Jun. 5, 2017, 16 pages.
International Search Report and Written Opinion dated May 18, 2020 issued in International Application No. PCT/KR2020/001225.

* cited by examiner

| TYPE | LOCATION | SPACE |
|---|---|---|
| B | (X1, Y1, Z1) | A |
| C | (X2, Y2, Z2) | A |
| D | (X3, Y3, Z3) | A |
| E | (X4, Y4, Z4) | A |
| F | (X5, Y5, Z5) | A |
| G | (X6, Y6, Z6) | A |
| H | (X7, Y7, Z7) | A |

FIG.6

| TARGET OBJECT | COUNTERPART OBJECT | LOCATION RELATION |
|---|---|---|
| B | C | Above |
| | D | Below |
| | E | Right |
| | F | Left |
| | G | Back |
| | H | Front |

FIG.7

METHOD OF CONTROLLING EXTERNAL ELECTRONIC DEVICE AND ELECTRONIC DEVICE FOR SUPPORTING SAME

CROSS-REFERENCE TO RELATED APPLICATION

This application is based on and claims priority under 35 U.S.C. § 119 to Korean Patent Application No. 10-2019-0008781, filed on Jan. 23, 2019, in the Korean Intellectual Property Office, the disclosure of which is incorporated by reference herein in its entirety.

BACKGROUND

1) Field

The disclosure relates to a method of controlling an external electronic device and an electronic device for supporting the same.

2) Description of Related Art

An electronic device having a voice recognition solution may perform a function in response to a user's voice input. For example, the electronic device may perform voice recognition on a voice input received through a microphone and, when a predetermined instruction is included in the result of the voice recognition, perform a function corresponding to the corresponding instruction.

For the electronic device performing the function in response to the user's voice input, a user may use a name referring to the corresponding electronic device as an identifier that can be distinguished from another electronic device. For example, when the user speaks the name of the electronic device of which the function is controlled, the electronic device using the corresponding name may be activated to perform the function.

In a system in which a plurality of Internet of Things (IoT) devices are connected through a wired/wireless network, each of the IoT devices may use a name referring to the corresponding IoT device to be distinguished from each other. Accordingly, when the user speaks a name of an IoT device of which a function is controlled, an IoT hub device, which includes a microphone and serves to connect and control IoT devices, may perform voice recognition in response to a user's voice input and control the IoT device using the corresponding name to perform a function, or the IoT device, which includes a microphone and uses the corresponding name, may directly perform voice recognition in response to a user's voice input and perform a predetermined function.

In general, when releasing the electronic device, a manufacturer of the electronic device may configure a name of the electronic device in consideration of a type or a function of the electronic device. Further, a user having purchased the electronic device may change the preset name of the electronic device into a name which the user desires according to user convenience.

In an environment in which a plurality of electronic devices which are of the same type or perform the same function exist or link to each other within a specific space, when names of the electronic devices configured by a manufacturer are used without any change, the manufacturer configures the names of the electronic devices in consideration of types or functions thereof, so that names of the electronic devices may be the same as each other. Accordingly, although a user speaks a name of an electronic device, it may be difficult to perform a function thereof since the number of electronic devices using the corresponding name is plural. Further, if the user changes the names of the electronic devices, the user is inconvenienced by having to remember names of all electronic devices.

Conventionally, even though an electronic device has a function related to a direction or a location, the corresponding function is limited to designating an absolute direction (for example, upward, downward, leftward, and rightward) based on the location of the electronic device or an absolute location indicating fixed information of an area (or space). That is, it may be difficult to perform the function of the electronic device in connection with a relative direction based on a neighboring object or a relative location to the neighboring object.

The above information is presented as background information only to assist with an understanding of the disclosure. No determination has been made, and no assertion is made, as to whether any of the above might be applicable as prior art with regard to the disclosure.

SUMMARY

Embodiments of the disclosure may provide a method of identifying an external electronic device to be controlled through a configured name based on the location relation with a neighboring object and controlling the identified external electronic device, and an electronic device for supporting the same.

Example embodiments of the disclosure may also provide a method of controlling an external electronic device to perform a function related to a least one of a direction or a location based on the location relation with a neighboring object, and an electronic device for supporting the same.

In accordance with an example aspect of the disclosure, an electronic device is provided. The electronic device includes: a communication circuit configured to communicate with an external electronic device; a processor operatively connected to the communication circuit; and a memory operatively connected to the processor, wherein the memory stores instructions which, when executed, cause the processor to control the electronic device to: acquire first information on types of a plurality of objects disposed within a first space and second information on locations of the plurality of objects in a first direction for the first space, select a target object to be named from among the plurality of objects, generate at least one first name of the target object based on information on a type of the target object in the first information, generate at least one second name of at least one counterpart object based on information on a type of the counterpart object disposed around the target object in the first information, determine a relative location relation between the target object and the at least one counterpart object based on the second information, and generate at least one third name of the target object based on the at least one first name, the at least one second name, and the relative location relation between the target object and the at least one counterpart object.

In accordance with another example aspect of the disclosure, an electronic device is provided. The electronic device includes: a camera: a communication circuit; a processor operatively connected to the camera and the communication circuit; and a memory operatively connected to the processor, wherein the memory stores instructions which, when executed, cause the processor to control the electronic device to: acquire a first image related to a first space in which at least one external electronic device is disposed through the camera or the communication circuit, acquire first information related to a type of the at least one external electronic device disposed within the first space and second information related to a location of the at least one external electronic device in a first direction for the first space by analyzing the first image, generate a name of the at least one external electronic device based on the first information, determine a location relation between the electronic device and the at least one external electronic device based on the second information, and generate a name of the at least one external electronic device based on at least some of the first information and the second information.

In accordance with another example aspect of the disclosure, a method of controlling an external electronic device by an electronic device is provided. The method including: acquiring a voice instruction through a microphone; performing voice recognition on the voice instruction; identifying an external electronic device to be controlled based on a name-related expression included in a result of the voice recognition; determining a direction or a location for a function of the external electronic device based on a function-related expression included in the result of the voice recognition; and transmitting a signal related to the function of the external electronic device and the direction or the location for the function of the external electronic device to the external electronic device through a communication circuit.

According to various example embodiments of the disclosure, the user can intuitively indicate an electronic device based on the location relation between the electronic device to be controlled and neighboring objects, thereby increasing convenience of the use of a voice recognition solution.

According to various embodiments of the disclosure, the user can intuitively instruct a control function related to at least one of a direction or a location based on the location relation with neighboring objects, thereby increasing convenience of the use of a voice recognition solution.

Further, various effects directly or indirectly detected through the disclosure can be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 6 is a diagram illustrating example information on a type, location, and space of an object according to various embodiments of the disclosure;

FIG. 7 is a diagram illustrating example information on the location relation between objects according to various embodiments of the disclosure;

In connection with description of drawings, the same or similar reference numerals may be used for the same or similar elements.

DETAILED DESCRIPTION

Figure 1:
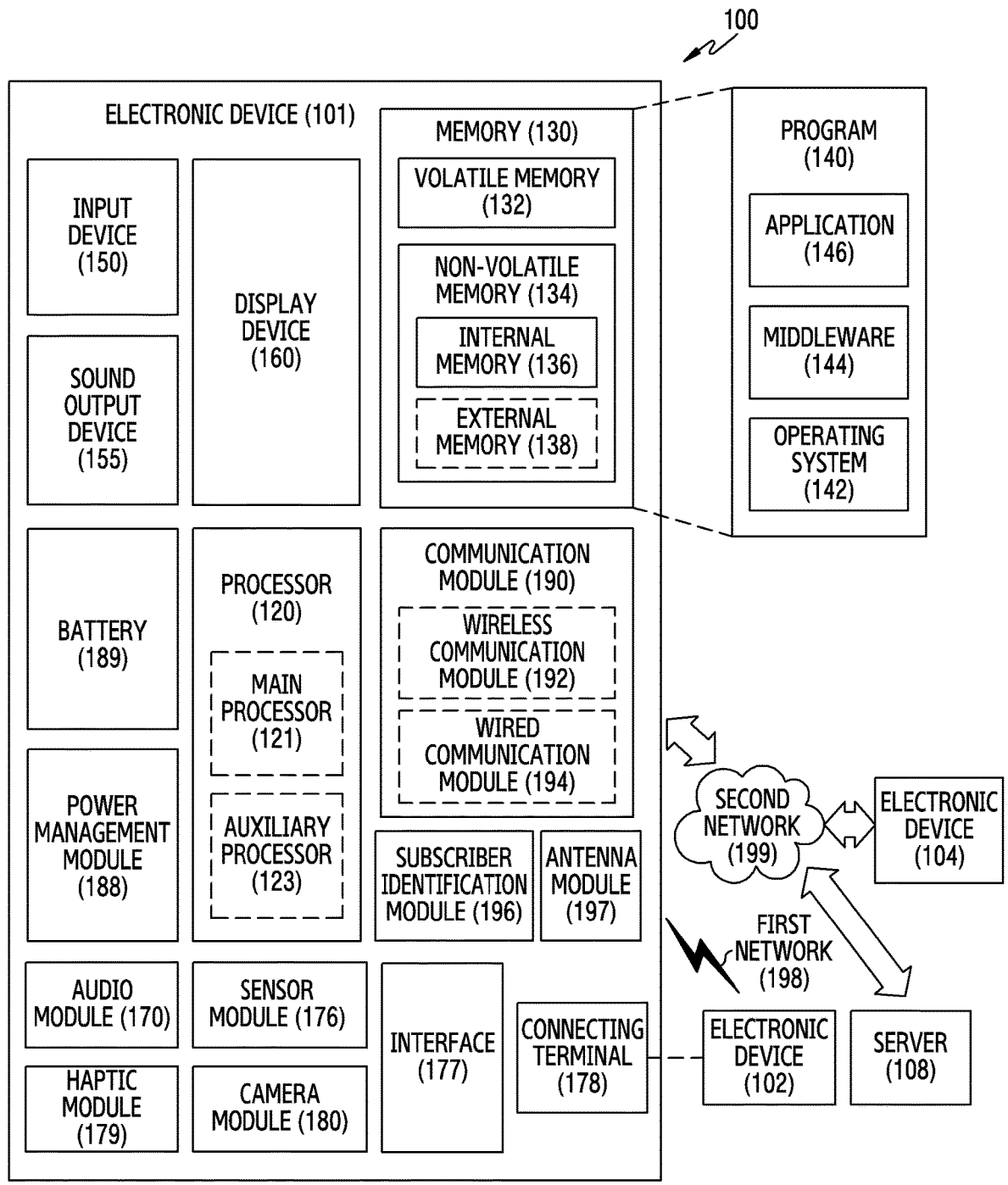
FIG. 1 is a block diagram illustrating an example electronic device in a network environment according to various embodiments.

Hereinafter, various example embodiments of the disclosure will be described in greater detail with reference to the accompanying drawings. For convenience of description, elements illustrated in the drawings may be exaggerated or reduced, and the disclosure is not limited by the drawings.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
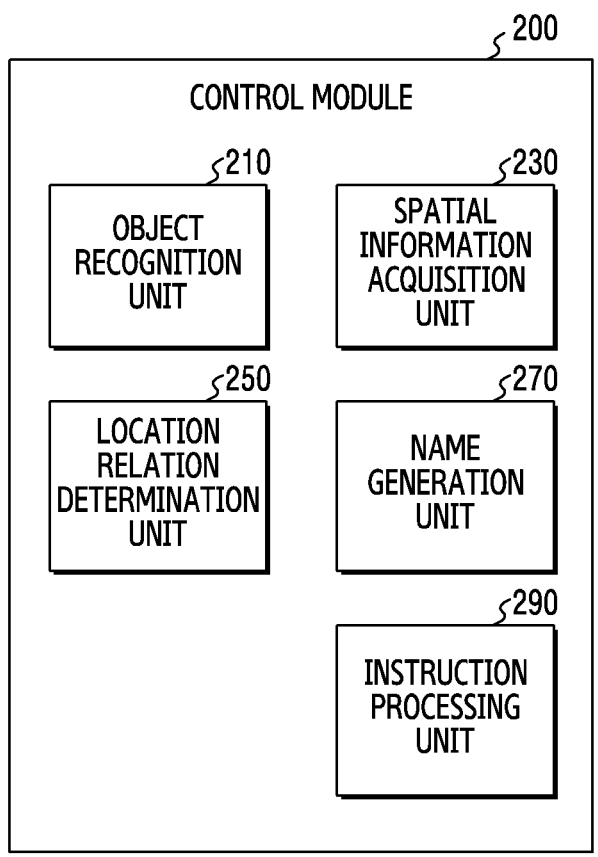
FIG. 2 is a block diagram illustrating an example control module of the electronic device according to various embodiments.

FIG. 2 is a block diagram illustrating an example control module of the electronic device according to various embodiments of the disclosure. A control module 200 of FIG. 2 may be implemented as the hardware or software element of the electronic device 101 illustrated in FIG. 1.

For example, the control module 200 may be implemented in the form of the program 140 stored in the memory 130 of the electronic device 101. For example, the control module 200 may be implemented by an instruction stored in the memory 130, and the instruction may cause the processor 120 to perform a function corresponding to the instruction when executed.

Referring to FIG. 2, the control module 200 may include an object recognition unit (e.g., including processing circuitry and/or executable program elements) 210, a spatial information acquisition unit (e.g., including processing circuitry and/or executable program elements) 230, a location relation determination unit (e.g., including processing circuitry and/or executable program elements) 250, a name generation unit (e.g., including processing circuitry and/or executable program elements) 270, and an instruction processing unit (e.g., including processing circuitry and/or executable program elements) 290.

The object recognition unit 210 may include various processing circuitry and/or executable program elements and recognize objects in a specific space. For example, the object recognition unit 210 may determine types of objects in the specific space and locations of the objects in the specific space. The object recognition unit 210 may recognize objects in an image recognition method, a radio wave/sound wave recognition method, or a recognition method through an IoT system. The object may include an electronic device or furniture, and a shape or a function of the object may be detected through image analysis, but the disclosure is not limited thereto.

The image recognition method may include a method of recognizing objects within an image using an algorithm based on deep learning. When objects are recognized through the image recognition method, the object recognition unit 210 may acquire an image obtained by capturing the specific space from the camera module 180 within the electronic device 101 or acquire an image obtained by capturing the specific space from an external electronic device (for example, the electronic device 102, the electronic device 104, or the server 108) connected to the electronic device 101 through the communication module 190. Further, when an image is acquired, the object recognition unit 210 may recognize objects included in the image through, for example, and without limitation, a Region-Convolution Neural Network (R-CNN) algorithm, a fast R-CNN algorithm, a You Only Look Once (YOLO) algorithm, or the like, that is a multi object detection technology. The object recognition unit 210 may acquire device information of objects recognized using a technology such as Bluetooth or Wi-Fi direct, map the acquired device information to information on types and locations of the objects, and store the mapping information in the memory 130.

The radio wave/sound wave recognition method may include a method of radiating radio waves or sound waves to the specific space, receiving and analyzing signals reflected from objects within the specific space, and recognizing the objects. For example, the object recognition unit 210 may determine shapes and locations of the objects within the specific space by comparing the direction or intensity of the radiated radio waves or sound waves with the direction and intensity of the received signal. Further, the object recognition unit 210 may determine types of the objects by comparing the shapes of the objects with information on shapes of various objects pre-stored in the memory 130.

The recognition method through the IoT system may include a method of receiving types and locations of IoT devices (objects) disposed within a specific space, connected to an IoT hub device, from the IoT hub device. In the IoT system, the IoT hub device serves to connect and control the IoT devices and, when the IoT devices are initially connected to the IoT hub device (when the IoT device is registered in the IoT hub device), may store information on types and location of the IoT devices. Accordingly, when objects within the specific space are IoT devices, the object recognition unit 210 may acquire information on types and locations of the IoT devices from the IoT hub device (or server).

According to an embodiment, when the IoT system is a smart home system, the object recognition unit 210 may detect a change in the ceiling, bottom, and walls of a specific space (for example, within home) through sensors included in the smart home system and determine types and locations of the objects within the specific space.

The spatial information acquisition unit 230 may include various processing circuitry and/or executable program elements and acquire spatial information of the specific space in which the objects recognized through the object recognition unit 210 are disposed. The spatial information may include structure information determined based on shapes and locations of structures (for example, ceiling, bottom, and walls) included in the specific space, arrangement information including types and locations of the objects disposed within the specific space, and space names (for example, living room, bathroom, kitchen, or bedroom) referring to the specific space.

The structure information and the arrangement information of the spatial information may be acquired during a process in which the object recognition unit 210 recognizes the objects. For example, the structure information and the arrangement information of the specific space may be acquired during a process in which the object recognition unit 210 acquires and analyzes an image of the specific space.

In the spatial information, the space name referring to the specific space may be acquired through comparison with spatial information of a plurality of pre-stored spaces or acquired through user input. For example, the spatial information acquisition unit 230 may obtain similarity by comparing the structure information and the arrangement information of the specific space with structure information and arrangement information of spatial information pre-stored in the memory 130. When there is spatial information (structure information and arrangement information) having similarity larger than or equal to a threshold value, the name of the specific space may be configured to be the same as a name of the corresponding spatial information. In another example, the spatial information acquisition unit 230 may acquire the name of the spatial space based on user input received through the input device 150 included in the electronic device 101 or an input means of an external electronic device (for example, the electronic device 102, the electronic device 104, or the server 108) connected to the electronic device 101. For example, the name of the specific space may be configured as a name selected by the user.

The location relation determination unit 250 may include various processing circuitry and/or executable program elements and determine the location relation between objects within the specific space. The location relation determination unit 250 may determine the location relation between the objects based on information on the locations of the objects acquired during the object recognition process of the object recognition unit 210. For example, the location relation determination unit 250 may determine the location relation between the objects through a relational reasoning network algorithm that may include a deep-learning technology for extracting the relation between the objects in the image obtained by capturing the specific space. Information (for example, a coordinate value) on the locations of the objects may be used as learning data for determining the location relation between the objects. Further, the location relation determination unit 250 may store information on the location relation between the objects in the memory 130.

According to an embodiment, in order to more accurately detect the locations of the objects, the location relation determination unit 250 may use depth information of the objects within the specific space. The depth information of the objects may be additionally acquired through a depth camera.

The name generation unit 270 may include various processing circuitry and/or executable program elements and generate names of the objects based on information on types of the objects acquired during the object recognition process of the object recognition unit 210. The name generated based on the type of the object may correspond to a default name normally referring to the object. For example, when the type of the object is an electric lamp, the name generation unit 270 may generate the name of the object to be "electric lamp", "lamp", "light", or "lighting". According to various example embodiments, the name generation unit 270 may map all names, which can be generated based on the type of the object, and store the same in the memory 130. For example, when the type of the object is an electric lamp, the name generation unit 270 may map "electric lamp", "lamp", "light", and "lighting", which can be generated as the name of the object, to each other and store the same in the memory 130. Accordingly, when the user speaks any of the "electric lamp", "lamp", "light", or "lighting", the electronic device 101 may select an object of which the type is an electric lamp as a target object.

The name generation unit 270 may generate names of the objects based on information on the location relation between the objects determined through the location relation determination unit 250. When a target object, which is a target to be named, is selected, the name generation unit 270 may generate a location relation-based descriptive name of the target object based on the location relation between the target object and a counterpart object disposed around the target object. For example, the name generation unit 270 may generate a descriptive name (third name) of the target object based on the location relation with the counterpart object based on a default name (first name) of the target object generated based on the type of the target object, a default name (second name) of the counterpart object generated based on the type of the counterpart object, and the location relation between the target object and the counterpart object. For example, the name generation unit 270 may generate the third name by sequentially combining the second name, the expression indicating the location relation, and the first name. The name generation unit 270 may add an expression indicating a state while generating the third name. For example, the third name may include the expression such as "exist", "is disposed", or "is located" indicating the presence state or the expression such as "does not exist", "is not disposed", or "is not located" indicating the absence state.

The expression indicating the location relation between the target object and the counterpart object, such as "above" (or "upper part"), "below" (or "lower part"), "right" (or "right side"), "left" (or "left side"), "back" (or "backward"), or "front" ("or forward"). The expression indicating the location relation is not limited to the above-described expressions, but may generally include various expressions indicating a relative location between objects. For example, the expression indicating the location relation may include expressions indicating a bearing or a direction.

According to an embodiment, the name generation unit 270 may generate the name of the target object based on spatial information of the specific space, in which the target object acquired is disposed, acquired through the spatial information acquisition unit 230. For example, the name generation unit 270 may generate the name of the target object based on a space name (for example, living room, bathroom, kitchen, or bedroom) referring to the specific space among the spatial information. The name generation unit 270 may generate a space-based descriptive name (fifth name) of the target object based on the default name (first name) of the target object generated based on the type of the target object and a space name (fourth name) referring to the specific space in which the target object is disposed. For example, the name generation unit 270 may generate the fifth name by sequentially combining the fourth name and the first name. The name generation unit 270 may add an expression indicating a state while generating the fifth name. For example, the fifth name may include the expression such as "exist", "is disposed", or "is located" indicating the presence state or the expression such as "does not exist", "is not disposed", or "is not located" indicating the absence state.

In another example, the name generation unit 270 may generate the name of the target object based on structure information and arrangement information of the spatial information. For example, the name generation unit 270 may generate the name of the target object based on information on the location relation between the target object and structures (for example, ceiling, bottom, or walls) included in the specific space. When the target object is disposed on the structure or adjacent thereto, the name generation unit 270 may generate a descriptive name (seventh name) of the target object based on the location relation with the structure based on the default name (first name) of the target object generated based on the type of the target object, a name (sixth name) referring to the structure (for example, "ceiling", "bottom", or "wall"), and the location relation between the target object and the structure. For example, the name generation unit 270 may generate the seventh name by sequentially combining the sixth name, the expression indicating the location relation, and the first name. The name generation unit 270 may add an expression indicating a state while generating the seventh name. For example, the seventh name may include the expression such as "exist", "is disposed", or "is located" indicating the presence state or the expression such as "does not exist", "is not disposed", or "is not located" indicating the absence state.

In this connection, information on the location relation between the target object and the structure included in the specific space may be generated through the location relation determination unit 250 and transferred to the name generation unit 270. The location relation determination unit 250 may generate information on the location relation between the target object and the structure based on information on the shape and location of the structure included in the structure information and information on the location of the target object included in the arrangement information.

The instruction processing unit 290 may include various processing circuitry and/or executable program elements and process a user's voice input received, for example, through a microphone. For example, the instruction processing unit 290 may convert the voice input into text data by performing voice recognition on the voice input and extract an expression related to a name and an expression related to a function from the text data.

According to an embodiment, the instruction processing unit 290 may identify the target object based on the expression related to the name. The target object may be the electronic device 101 or an external electronic device (for example, the electronic device 102 or the electronic device 104) capable of communicating with the electronic device 101. Further, the expression related to the name may include, for example, a name (default name) generated based on the type of the target object, a name (first location relation-based descriptive name) generated based on the location relation with a surrounding object, a name (space-based descriptive name) generated based on a space name of the space in which the target object is disposed, or a name (second location relation-based descriptive name) generated based on the location relation between the structure included in the space in which the target object is disposed.

According to an embodiment, the instruction processing unit 290 may determine an instruction based on the expression related to the function. The instruction may include a trigger input of at least one function to be performed among functions which can be performed by the target object. When the function to be performed is a function related to the direction or location (for example, a movement function or a function having an operational direction), the expression related to the function may include an expression indicating absolute direction or an absolute location indicating fixed information of an area (or space) based on the location of the target object or an expression indicating a relative direction or a relative location based on the location relation with the surrounding object.

According to an embodiment, when the identified target object is the electronic device 101, the instruction processing unit 290 may transfer a signal related to the instruction to a relevant module within the electronic device 101. Further, when the identified target object is the external electronic device (for example, the electronic device 102 or the electronic device 104), the instruction processing unit 290 may transmit a signal related to the instruction to the external electronic device (for example, the electronic device 102 or the electronic device 104).

Figure 3:
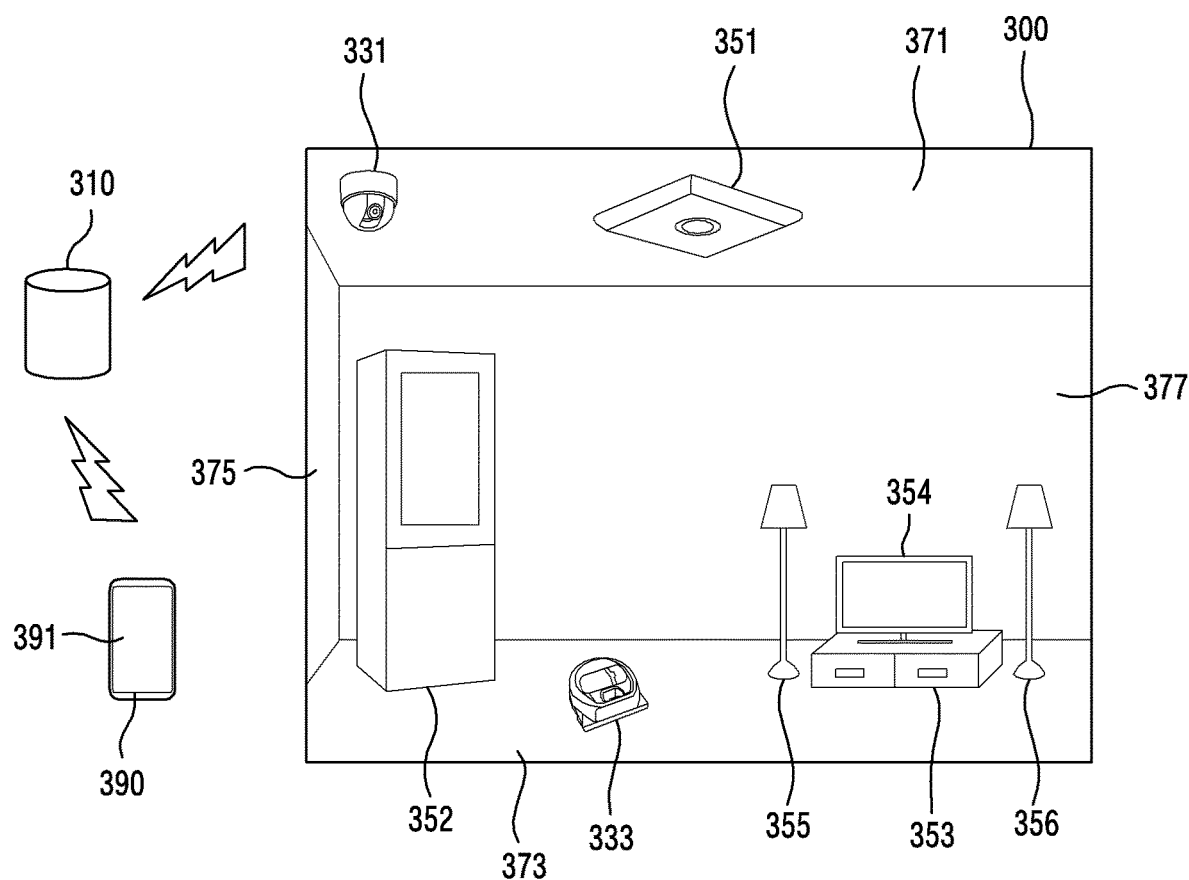
FIG. 3 is a diagram illustrating an example environment in which a plurality of electronic devices exist within a specific space or are linked to each other to operate according to various embodiments.

FIG. 3 is a diagram illustrating an example environment in which a plurality of electronic devices exist within a specific space or operate while linking with each other.

Referring to FIG. 3, a plurality of electronic devices (for example, electronic devices 331, 333, 351, 352, 353, 354, 355, 356, which may be referred to hereinafter as 331 to 356) disposed within a specific space 300 may be IoT devices belonging to an IoT system, in which an electronic device 310 serves as an IoT hub device, or electronic devices which can communication with the electronic device 310 but operate separately from other electronic devices. The plurality of electronic devices (for example, electronic devices 331 to 356) may be electronic devices which perform voice recognition on a user's voice input received through a microphone and perform a function according to the voice recognition result, or electronic devices which receive a signal related to the function according to the voice recognition result from the electronic device 310 (for example, the IoT hub device) and perform the function.

The control module 200 illustrated in FIG. 2 may be included in the electronic device 310 connected to at least one electronic device 331 to 356 disposed within the specific space 300 or included in the electronic devices 331 to 356 disposed within the specific space 300. In FIG. 3, the case in which the control module 200 is included in the electronic device 310 is described for convenience of description. The electronic device 310 may be disposed within the specific space 300 or in a space other than the specific space 300.

The electronic device 310 (for example, the electronic device 101) including the control module 200 may generate names of the plurality of electronic devices 331 to 356 disposed within the specific space 300. The electronic device 310 may acquire a captured image from the electronic device 331 and 333 including a camera capable of capturing the specific space 300 or the plurality of electronic devices disposed within the specific space 300. The electronic devices 331 and 333 including the camera may include, for example, a camera device 331 (for example, a CCTV camera) fixed and installed within the specific space 300 or a robot-type device 333 (for example, a robot vacuum cleaner) capable of capturing the specific space 300 during movement, but the disclosure is not limited thereto. According to various embodiments, the electronic device 310 may include a camera or may capture the specific space 300 or the plurality of electronic devices 331 to 356 disposed within the specific space 300 through the camera included in the electronic device 310 and acquire the captured image.

The electronic device 310 acquiring the captured image may recognize objects in the specific space 300 through the object recognition unit 210 of the control module 200. For example, in the environment illustrated in FIG. 3, the object recognition unit 210 may recognize an electric lamp 351 disposed on a ceiling 371, a refrigerator 352 disposed near a left wall 375, a drawer 353 disposed on the right side on a bottom 373, a TV 354 disposed on the drawer 353, a first stand lamp 355 disposed on the left side of the TV 354, and a second stand lamp 356 disposed on the right side of the TV 354.

When the objects are recognized, the electronic device 310 may generate default names of the objects through the name generation unit 270 of the control module 200. For example, the name generation unit 270 may generate the default names of the objects based on information on types of the objects.

Thereafter, the electronic device 310 may acquire spatial information of the specific space 300 through the spatial information acquisition unit 230 of the control module 200. For example, in the environment illustrated in FIG. 3, the spatial information acquisition unit 230 may acquire structure information determined based on shapes and locations of the ceiling 371, the bottom 373, and the walls 375 and 377, arrangement information including types and locations of the object, and a name referring to the specific space 300. The structure information and the arrangement information may be acquired during the object recognition process of the object recognition unit 210, and the name referring to the specific space 300 may be acquired through comparison with spatial information of a plurality of spaces pre-stored in the memory 130 or through user input. For example, the spatial information acquisition unit 230 may acquire the name of the specific space 300 based on user input received through an input means of the external electronic device 390 (for example, the electronic device 102, the electronic device 104, or the server 108) connected to the electronic device 101. The input means of the external electronic device 390 may include, for example, a touch screen 391 of the external electronic device 390.

The electronic device 310 may determine the location relation between objects within the specific space 300 through the location relation determination unit 250 of the control module 200. For example, the location relation determination unit 250 may select a target object from the objects and determine the location relation between the target object and a counterpart object disposed around the target object. The target object may be an electronic device (for example, electronic devices 331, 333, 351, 352, which may be referred to hereinafter as 331 to 352 or 354, 355, 356, which may be referred to hereinafter as 354 to 356) which can be controlled among the objects, and the counterpart object may be any object disposed within the specific space 300. For example, when the TV 354 is selected as the target object, the location relation determination unit 250 may determine the location relation between the TV 354 and the drawer 353, the first stand lamp 355, or the second stand lamp 356 disposed around the TV 354. For example, in the environment illustrated in FIG. 3, the location relation determination unit 250 may determine that the TV 354 is disposed on the drawer 353, on the right side of the first stand lamp 355, and on the left side of the second stand lamp 356. As described above, information on the location relation between the target object and the counterpart object may be configured according to the number of counterpart objects disposed around the target object. For example, when the number of counterpart objects (for example, the drawer 353, the first stand lamp 355, and the second lamp stand 356) disposed around the target object (for example, the TV 354) is three, location relation information related to the target objects may be configured to have three items (for example, a first item indicating the location relation with the drawer 353, a second item indicating the location relation with the first stand lamp 355, and a third item indicating the location relation with the second stand lamp 356).

When the location relation between the objects is determined, the electronic device 310 may generate descriptive names of the objects through the name generation unit 270. For example, the name generation unit 270 may generate descriptive names of the objects based on information on the location relation between the objects. For example, the name generation unit 270 may generate a descriptive name of the target object based on the location relation with the counterpart object based on a default name of the target object generated based on the type of the target object, a default name of the counterpart object generated based on the type of the counterpart object, and the location relation between the target object and the counterpart object. For example, in the environment illustrated in FIG. 3, when the target object is the TV 354 and the counterpart object is the drawer 353, the name generation unit 270 may generate the descriptive name of the TV 354 by sequentially combining a default name (for example, "drawer") of the drawer 353, an expression (for example, "on") indicating the location relation between the TV 354 and the drawer 353, and a default name (for example, "TV") of the TV 354. The name generation unit 270 may use an expression (for example, "exist") indicating a state while generating the descriptive name of the TV 354. For example, the name generation unit 270 may add the expression (for example, "exist") indicating the state to the expression (for example, "on") indicating the location relation between the TV 354 and the drawer 353. Accordingly, the descriptive name of the TV 354 may be generated as, for example, "TV existing on the drawer".

According to an embodiment, the name generation unit 270 may generate the descriptive name of the target object based on spatial information of the specific space 300, in which the target object is disposed, acquired through the spatial information acquisition unit 230. For example, the name generation unit 270 may generate the descriptive name of the target object based on the space name (for example, living room, bathroom, kitchen, or bedroom) referring to the specific space 300 in the spatial information. The name generation unit 270 may generate the space-based descriptive name of the target object based on the default name of the target object and the space name of the specific space 300 in which the target object is disposed. For example, in the environment illustrated in FIG. 3, when the target object is the refrigerator 352, the name generation unit 270 may generate a descriptive name of the refrigerator 352 by sequentially combining a space name (for example, "living room") of the specific space 300 and a default name (for example, "refrigerator") of the refrigerator 352. For example, the name generation unit 270 may use the postposition particle (for example, "in") and an expression (for example, "exist") indicating a state while generating the descriptive name of the refrigerator 352. For example, the name generation unit 270 may add the postposition particle (for example, "in") and the expression (for example, exist) indicating the state between the space name (for example, "living room" of the specific space 300 and the default name (for example, "refrigerator") of the refrigerator 352. Accordingly, the descriptive name of the refrigerator 352 may be generated as, for example, "refrigerator existing in the living room".

In another example, the name generation unit 270 may generate a descriptive name of the target object based on structure information and arrangement information of the spatial information. The name generation unit 270 may generate the descriptive name of the target object based on information on the location relation between the target object and the structure (for example, ceiling 371, bottom 373, or walls 375 and 377) included in the specific space 300. For example, in the environment illustrated in FIG. 3, when the target object is the electric lamp 351 and the structure is the ceiling 371, the name generation unit 270 may generate a descriptive name of the electric lamp 351 by sequentially combining a name (for example, "ceiling") referring to the ceiling 371, an expression (for example, "on") indicating the location relation between the electric lamp 351 and the ceiling 371 (when the target object is added to the structure, they does not have the up, down, left, and right relation and thus the postposition particle "on" is used to express the location relation), and a default name (for example, "electric lamp") of the electric lamp 351. The name generation unit 270 may use an expression (for example, "exist") indicating a state while generating the descriptive name of the electric lamp 351. For example, the name generation unit 270 may add the expression (for example, "exist") indicating the state to the expression (for example, "on") indicating the location relation between the electric lamp 351 and the ceiling 371. Accordingly, the descriptive name of the electric lamp 351 may be generated as, for example, "electric lamp existing on the ceiling".

Figure 4A:
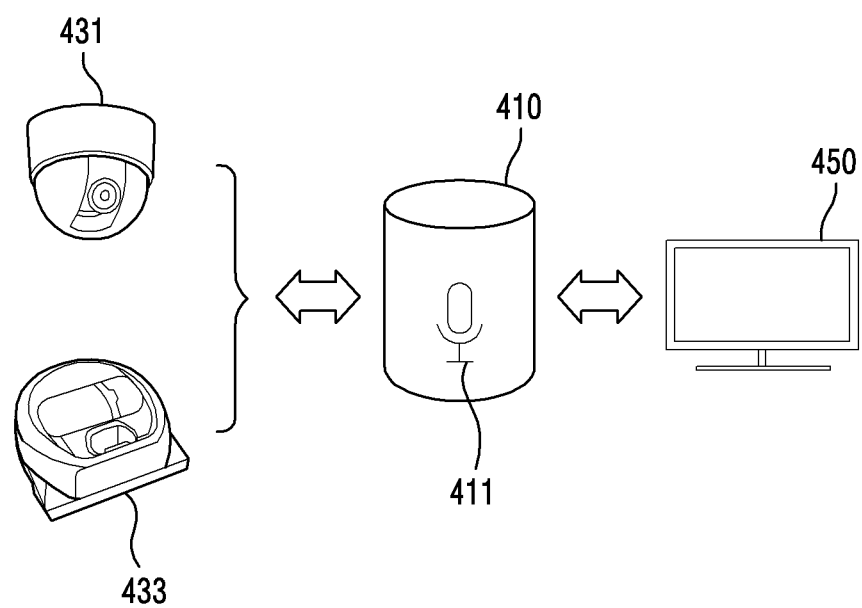
FIG. 4A is a diagram illustrating an example first environment in which an electronic device which is a target to be named is separate from an electronic device for controlling a function and generating a name according various embodiments of the disclosure.
Figure 4B:
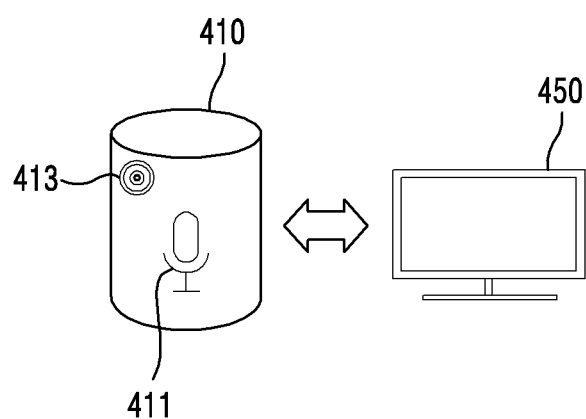
FIG. 4B is a diagram illustrating an example second environment in which an electronic device which is a target to be named is separate from an electronic device for controlling a function and generating a name according to various embodiments of the disclosure.
Figure 4C:
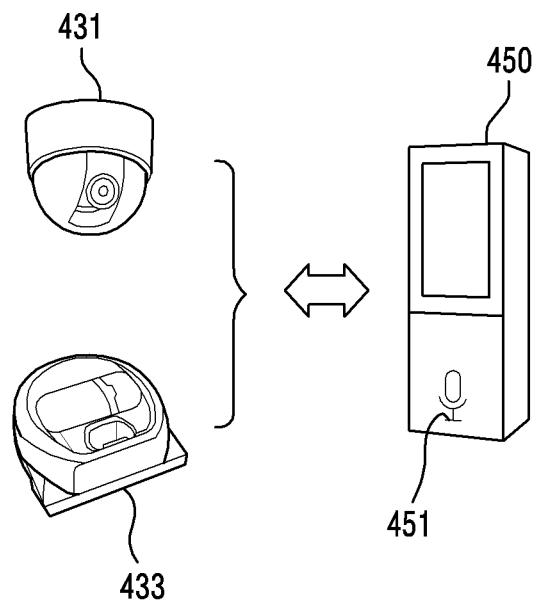
FIG. 4C is a diagram illustrating an example third environment in which an electronic device which is a target to be named directly generates a name and performs a function according to various embodiments of the disclosure.
Figure 4D:
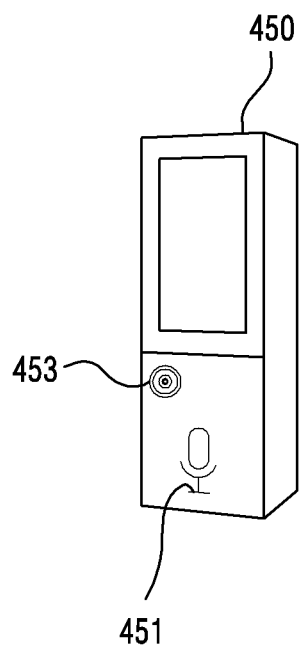
FIG. 4D is a diagram illustrating an example fourth environment in which an electronic device which is a target to be named directly generates a name and performs a function according to various embodiments of the disclosure.
Figure 4E:
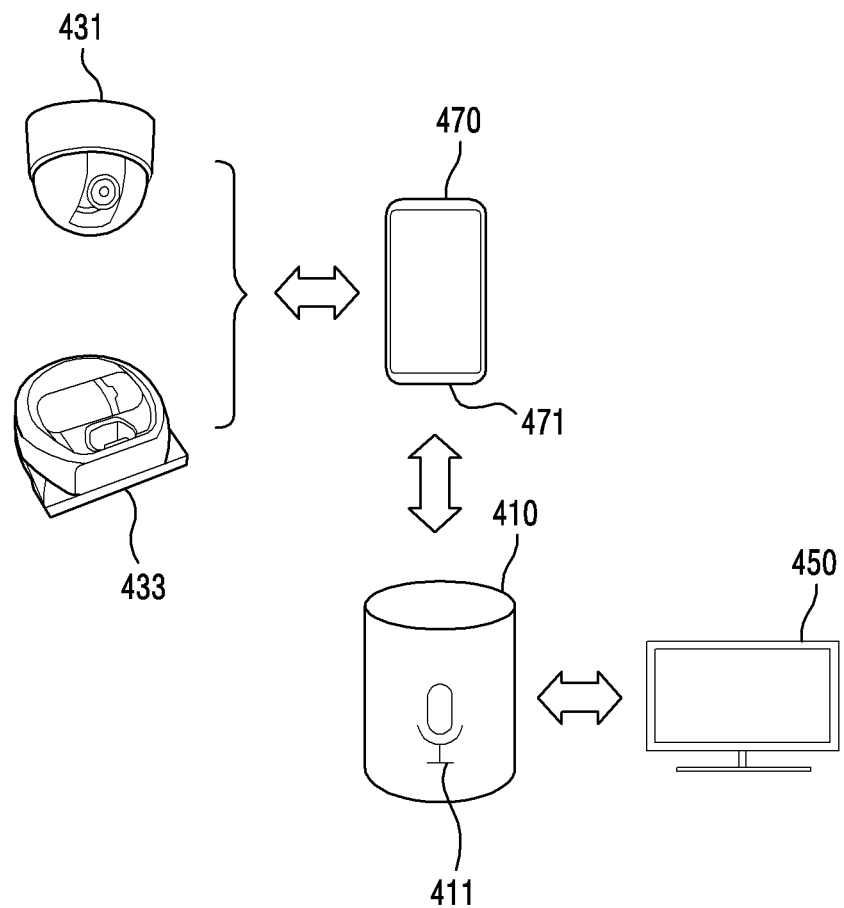
FIG. 4E is a diagram illustrating an example fifth environment in which an electronic device which is a target to be named, an electronic device for generating a name, and an electronic device for controlling a function are separate from each other according to various embodiments of the disclosure.
Figure 4F:
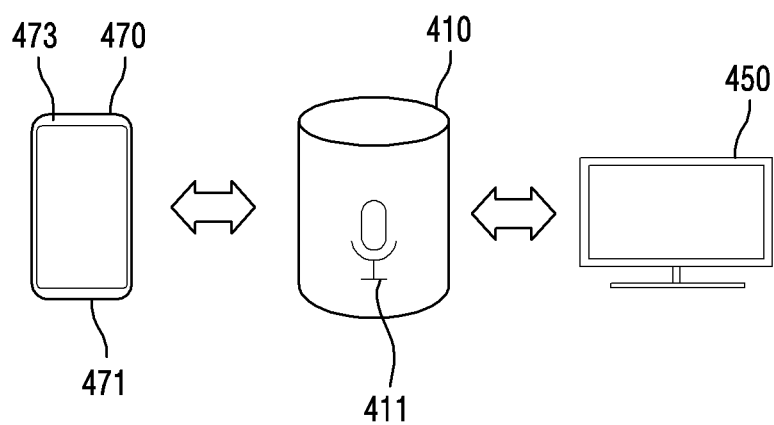
FIG. 4F is a diagram illustrating an example sixth environment in which an electronic device which is a target to be named, an electronic device for controlling a function are separate from each other according to various embodiments of the disclosure.

FIG. 4A is a diagram illustrating an example first environment in which an electronic device which is a target to be named is separate from an electronic device for controlling a function and generating a name according to various embodiments of the disclosure. FIG. 4B is a diagram illustrating an example second environment in which an electronic device which is a target to be named is separate from an electronic device for controlling a function and generating a name according to various embodiments of the disclosure. FIG. 4C is a diagram illustrating an example third environment in which an electronic device which is a target to be named directly generates a name and performs a function according to various embodiments of the disclosure. FIG. 4D is a diagram illustrating an example fourth environment in which an electronic device which is a target to be named directly generates a name and performs a function according to various embodiments of the disclosure. FIG. 4E is a diagram illustrating an example fifth environment in which an electronic device which is a target to be named, an electronic device for generating a name, and an electronic device for controlling a function are separate from each other according to various embodiments of the disclosure. FIG. 4F is a diagram illustrating an example sixth environment in which an electronic device which is a target to be named, an electronic device for controlling a function are separate from each other according to various embodiments of the disclosure.

In FIGS. 4A, 4B, 4C, 4D, 4E and 4F, the relation between a target to be named and the control module 200 for generating a name is described. A second electronic device 450 (target object) to be named may be a device capable of communicating with a first electronic device 410 including the control module 200 as illustrated in FIGS. 4A, 4B, 4E, and 4F or a device including the control module 200 to directly generate a name and perform a function as illustrated in FIGS. 4C and 4D.

Referring to FIGS. 4A and 4B, the first electronic device 410 including the control module 200 may generate a name of the second electronic device 450 disposed within a specific space. For example, the first electronic device 410 may generate a descriptive name of the second electronic device 450 based on information on the location relation between the second electronic device 450 (target object) and at least one other object (counterpart object) disposed within the specific space through an image obtained by capturing the specific space in which the second electronic device 450 is disposed. The image obtained by capturing the specific space may be acquired from a third electronic device 431 or 433 including a camera capable of capturing the specific space as illustrated in FIG. 4A or acquired through a camera 413 included in the first electronic device 410 as illustrated in FIG. 4B. The third electronic device 431 or 433 may include a camera device 431 (for example, a CCTV camera) fixed and installed within the specific space or a robot-type device 433 (robot vacuum cleaner) capable of capturing while moving in the specific space.

According to an embodiment, the first electronic device 410 may control the function of the second electronic device 450. The first electronic device 410 may include a microphone 411 and perform voice recognition on a user's voice input. For example, the first electronic device 410 may perform voice recognition based on a voice recognition solution or through a server (for example, the server 108). When the voice recognition result includes the name of the second electronic device 450 indicating the second electronic device 450, the first electronic device 410 may transmit an activation (for example, wake up) signal to the second electronic device 450. When the voice recognition result includes an instruction for performing a specific function, the first electronic device 410 may transmit a signal corresponding to the instruction to the second electronic device 450. For example, the first electronic device 410 illustrated in FIGS. 4A and 4B may be an IoT hub device, which includes a microphone and serves to connect and control IoT devices, and the second electronic device 450 may be an IoT device connected to the IoT hub device.

Referring to FIGS. 4C and 4D, the second electronic device 450 may include the control module 200 and generate the name of the second electronic device 450 by itself. For example, the second electronic device 450 may generate a descriptive name of the second electronic device 450 based on information on the location relation between the second electronic device 450 (target object) and at least one other object (counterpart object) disposed within the specific space through an image obtained by capturing the specific space in which the second electronic device 450 is disposed. The image obtained by capturing the specific space may be acquired from the third device 431 or 433 including the camera capable of capturing the specific space as illustrated in FIG. 4C or acquired through a camera 453 included in the second electronic device 450 as illustrated in FIG. 4D.

According to an embodiment, the second electronic device 450 may include a microphone 451 and perform voice recognition on a user's voice input. Further, when the voice recognition result includes the name of the second electronic device 450 indicating the second electronic device 450, the second electronic device 450 may be activated. When the voice recognition result includes an instruction for performing a specific function, the second electronic device 450 may perform the specific function corresponding to the instruction.

Referring to FIGS. 4E and 4F, at least some elements of the control module 200 may be included in a fourth electronic device 470. For example, the fourth electronic device 470 may include at least some of the object recognition unit 210, the spatial information acquisition unit 230, the location relation determination unit 250, and the name generation unit 270 of the control module 200. In this case, the fourth electronic device 470 may generate the name of the second electronic device 450 disposed within the specific space. For example, the fourth electronic device 470 may generate a descriptive name of the second electronic device 450 based on information on the location relation between the second electronic device 450 (target object) and at least one other object (counterpart object) disposed within the specific space through an image obtained by capturing the specific space in which the second electronic device 450 is disposed. The image obtained by capturing the specific space may be acquired from the third device 431 or 433 including the camera capable of capturing the specific space as illustrated in FIG. 4E or acquired through a camera 473 included in the fourth electronic device 470 as illustrated in FIG. 4F. The third electronic device 431 or 433 may include, for example, a camera device 431 (for example, a CCTV camera) fixed and installed within the specific space or a robot-type device 433 (robot vacuum cleaner) capable of capturing while moving in the specific space.

According to an embodiment, the fourth electronic device 470 may provide a UI supporting registration of neighboring devices (IoT devices) and generate names of the neighboring devices during a process of registering the neighboring devices. The fourth electronic device 470 may store the generated names of the neighboring devices in a database. For example, the names of the neighboring devices may be mapped to information on the neighboring devices (for example, types or locations of the neighboring devices, the location relation with neighboring objects, or information on a space in which the neighboring devices are disposed) and stored in the database. The database may be stored in a memory of the fourth electronic device 470 or in a memory of the first electronic device 410 capable of communicating with the fourth electronic device 470. For example, the fourth electronic device 470 may transmit the generated names of the neighboring devices to the first electronic device 410 through the communication module 471.

At least some elements of the control module 200 may be included in the first electronic device 410. For example, the instruction processing unit 290 of the control module 200 may be included in the first electronic device 410. In this case, the first electronic device 410 may control the function of the second electronic device 450. The first electronic device 410 may include the microphone 411, have a voice recognition solution, and perform voice recognition on a user's voice input. When the voice recognition result includes the name of the second electronic device 450 indicating the second electronic device 450, the first electronic device 410 may transmit an activation (for example, wake up) signal to the second electronic device 450 The first electronic device 410 may identify the second electronic device 450 based on information stored in the database. For example, the first electronic device 410 may search for the name of the second electronic device 450 in the database and identify the type or location of the second electronic device 450 mapped to the name of the second electronic device 450, the location relation with neighboring objects, or information on the space in which the second electronic device 450 is disposed. When the voice recognition result includes an instruction for performing a specific function, the first electronic device 410 may transmit a signal corresponding to the instruction to the second electronic device 450. According to some embodiments, the voice recognition solution may be mounted to a server (for example, the server 108). In this case, the first electronic device 410 may transmit the user's voice input received through the microphone 411 to the server, and the server may perform the voice recognition on the user's voice input and transmit the result thereof to the first electronic device 410.

Figure 5:
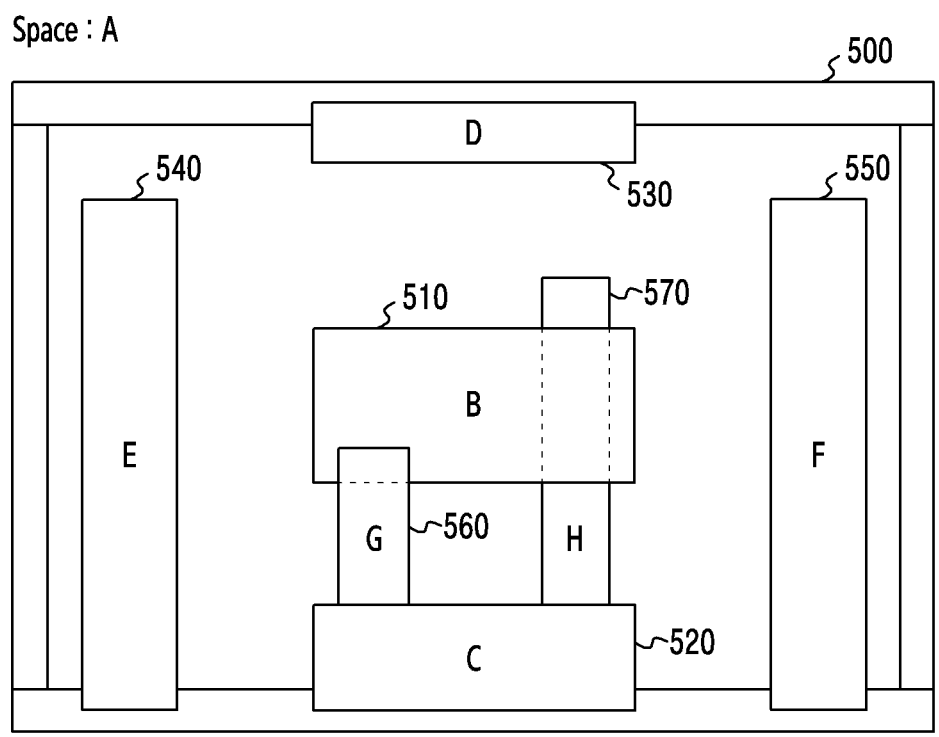
FIG. 5 is a diagram illustrating an example object recognition method according to various embodiments of the disclosure.
Figure 7:
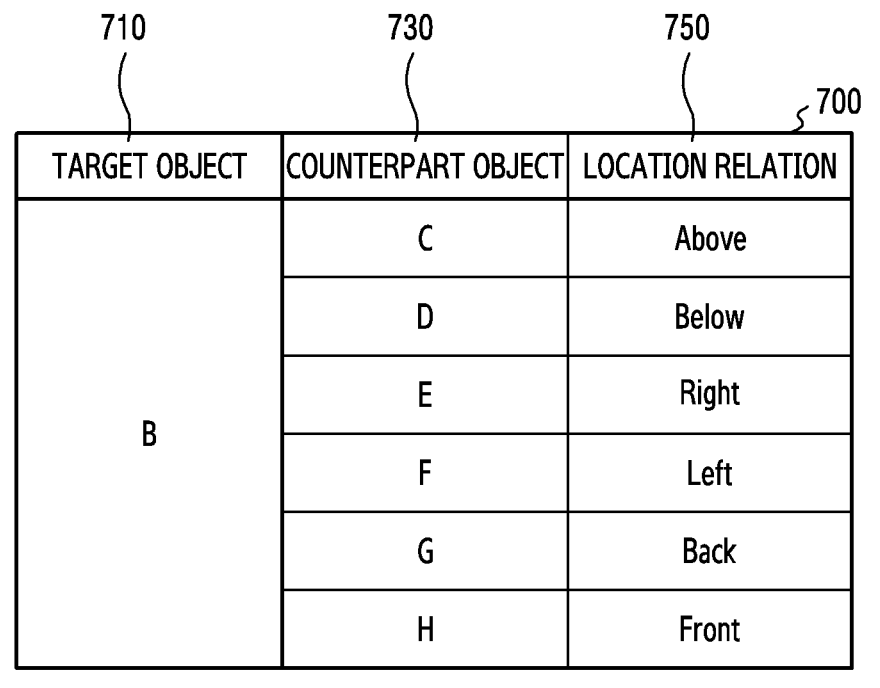

FIG. 5 is a diagram illustrating an example object recognition method according to various embodiments of the disclosure. FIG. 6 is a diagram illustrating example information on a type, location, and space of an object according to various embodiments of the disclosure. FIG. 7 is a diagram illustrating example information on the location relation between objects according to various embodiments of the disclosure.

Referring to FIGS. 5, 6 and 7, the control module 200 of FIG. 2 may recognize a plurality of objects disposed within a specific space (for example, space A). For example, the object recognition unit 210 of the control module 200 may determine types of objects in the specific space and locations of the objects in the specific space. In an environment illustrated in FIG. 5, the object recognition unit 210 may determine types and locations of a first object (B) 510, a second object (C) 520, a third object (D) 530, a fourth object (E) 540, a fifth object (F) 550, a sixth object (G) 560, and a seventh object (H) 570.

The object recognition unit 210 may map information 610 on types of the objects and information 630 on locations of the objects to the objects and store the information in the form of a table 600 in the memory 130 as illustrated in FIG. 6. When the specific space is expressed by three-dimensional coordinates (one position of the specific space is expressed by an X axis coordinate value, a Y axis coordinate value, and a Z axis coordinate value), the information 630 on the locations of the objects may be three-dimensional coordinate values of the respective objects. For example, the object recognition unit 210 may configure the center of the specific space as a central point of the three-dimensional coordinate axis. For example, when the specific space is a room, the center of the room may be the central point of the three-dimensional coordinate axis. In another example, when the electronic device including the name generation unit 270 captures the specific space (when an image obtained by capturing the specific space through a camera included in the electronic device is acquired), the object recognition unit 210 may configure the location of the electronic device as the central point of the three-dimensional coordinate axis. According to an embodiment, a three-dimensional coordinate value of a specific object may include a three-dimensional coordinate value for the central point of the specific object. According to another embodiment, the three-dimensional coordinate value of the specific object may include a plurality of three-dimensional coordinate values for corner points or boundary points of the specific object.

The spatial information acquisition unit 230 of the control module 200 may acquire spatial information 650 of the specific space. The spatial information 650 may include structure information determined by shapes and locations of structures included in the specific space, arrangement information including types and locations of the objects disposed within the specific space, and a space name referring to the specific space. Further, the spatial information acquisition unit 230 may map the acquired spatial information 650 of the specific space, the information 610 on types of the objects disposed within the specific space, and the information 630 on locations of the objects to each object and store the mapped information in the form of the table 600 in the memory 130 as illustrated in FIG. 6. FIG. 6 illustrates that a space name (for example, "A") referring to the specific space is stored in the table 600 as the spatial information 650, but is not limited thereto. In addition to the space name, the structure information and the arrangement information may be further stored in the table 600.

The location relation determination unit 250 of the control module 200 may determine the location relation between objects within the specific space. The location relation determination unit 250 may determine the location relation between the objects based on the information 630 on the locations of the objects. For example, the location relation determination unit 250 may select a target object from the objects and determine the location relation between the target object and a counterpart object disposed around the target object. Further, when the location relation between the target object and the counterpart object is determined, the location relation determination unit 250 may map information 710 on the target object, information 730 on the counterpart object, information 750 on the location relation between the target object and the counterpart object to each target object and each counterpart object and store the mapped information in the form of a table 700 in the memory 130 as illustrated in FIG. 7. FIG. 7 illustrates that, when the target object is the first object 510, the information 750 on the location relation with each counterpart object is stored in the table 700, but is not limited thereto. The table 700 may store information 750 on the location relation with each counterpart object 730 when the target object is the second object 520, the third object 530, the fourth object 540, the fifth object 550, the sixth object 560, or the seventh object 570.

According to an embodiment, the table 600 illustrated in FIG. 6 or the table 700 illustrated in FIG. 7 may be included in the database illustrated in FIGS. 4E and 4F. For example, the table 600 and the table 700 may be mapped to each other based on the target object and stored in the database, and the name of the target object may be also mapped and stored in the database.

Figure 8A:
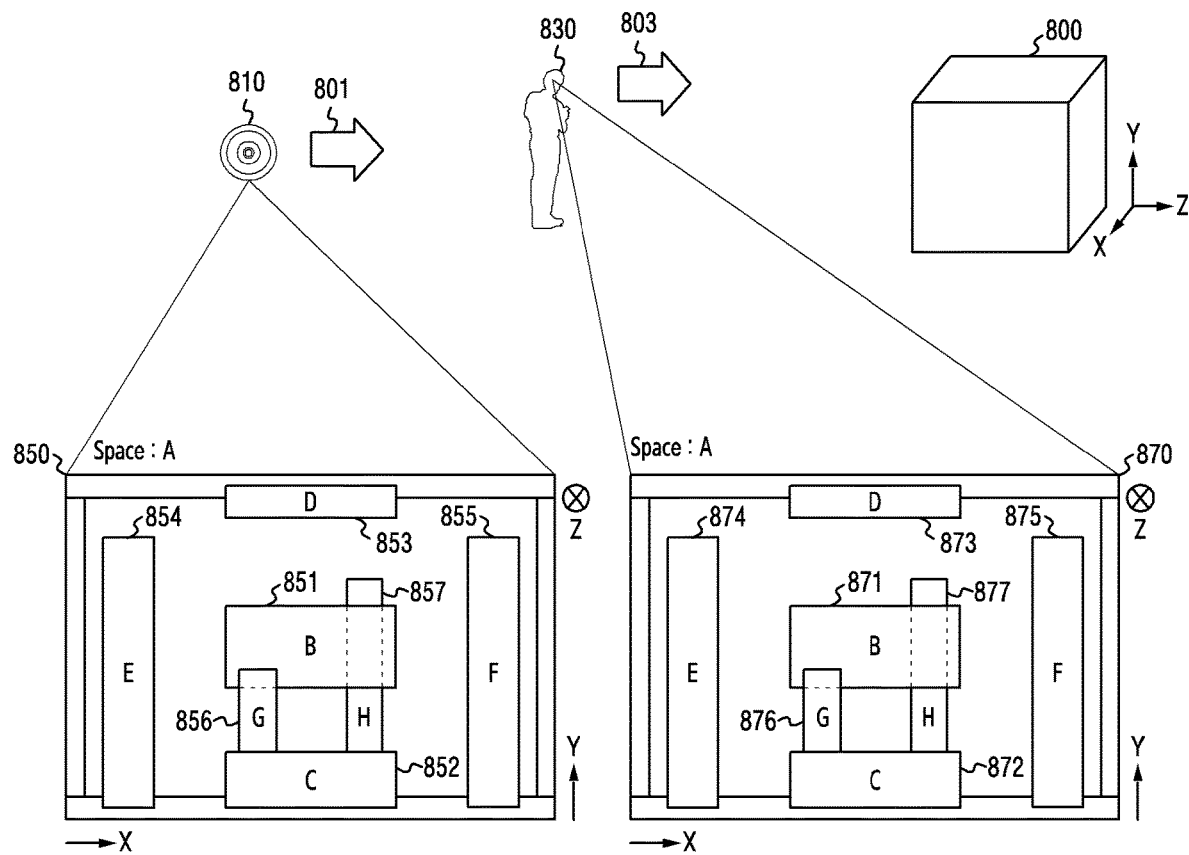
FIG. 8A is a diagram illustrating an example location relation between objects when a recognition direction of the objects and a gaze direction of the user are the same as each other according to various embodiments of the disclosure.

FIG. 8A is a diagram illustrating example location relation between objects when a recognition direction of the objects and a gaze direction of the user are the same as each other according to various embodiments of the disclosure.

Figure 8B:
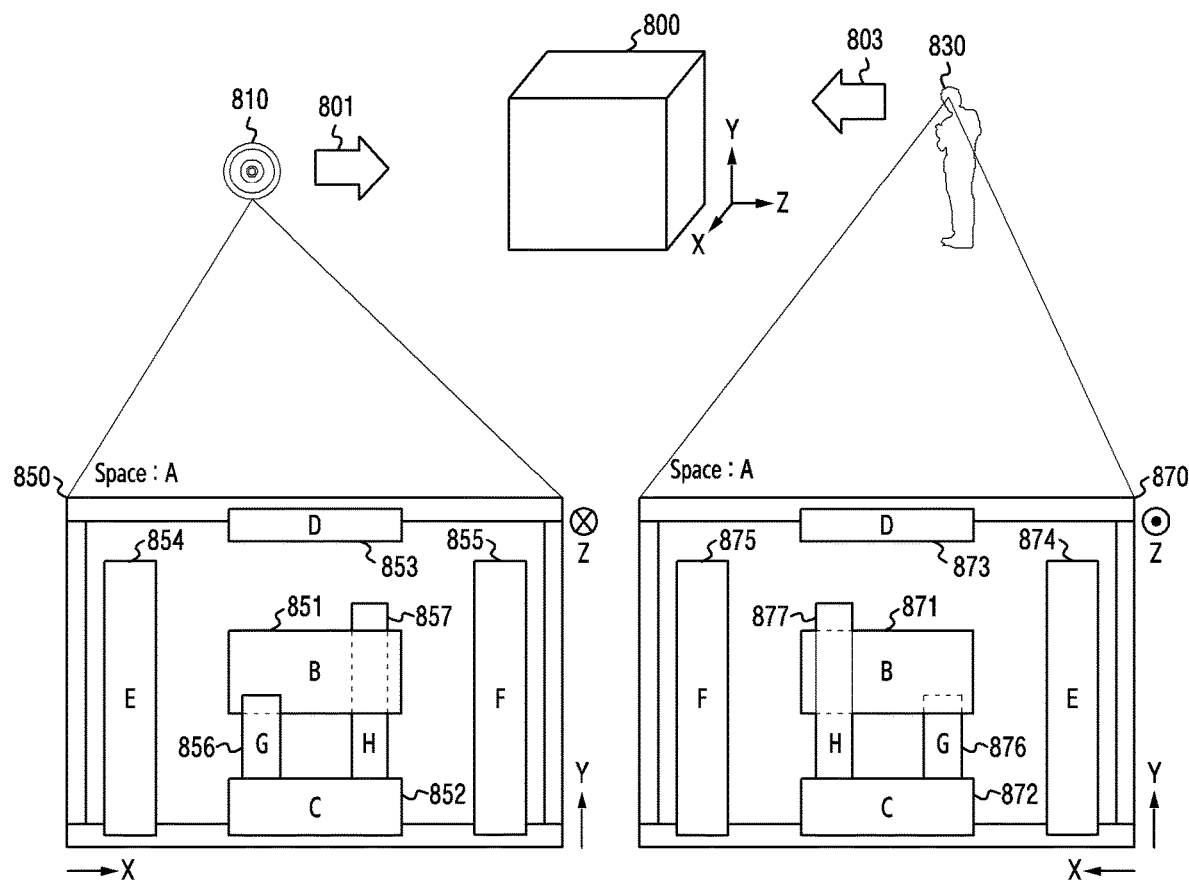
FIG. 8B is a diagram illustrating an example location relation between objects when a recognition direction of the objects and a gaze direction of the user are different from each other according to various embodiments of the disclosure.
Figure 8C:
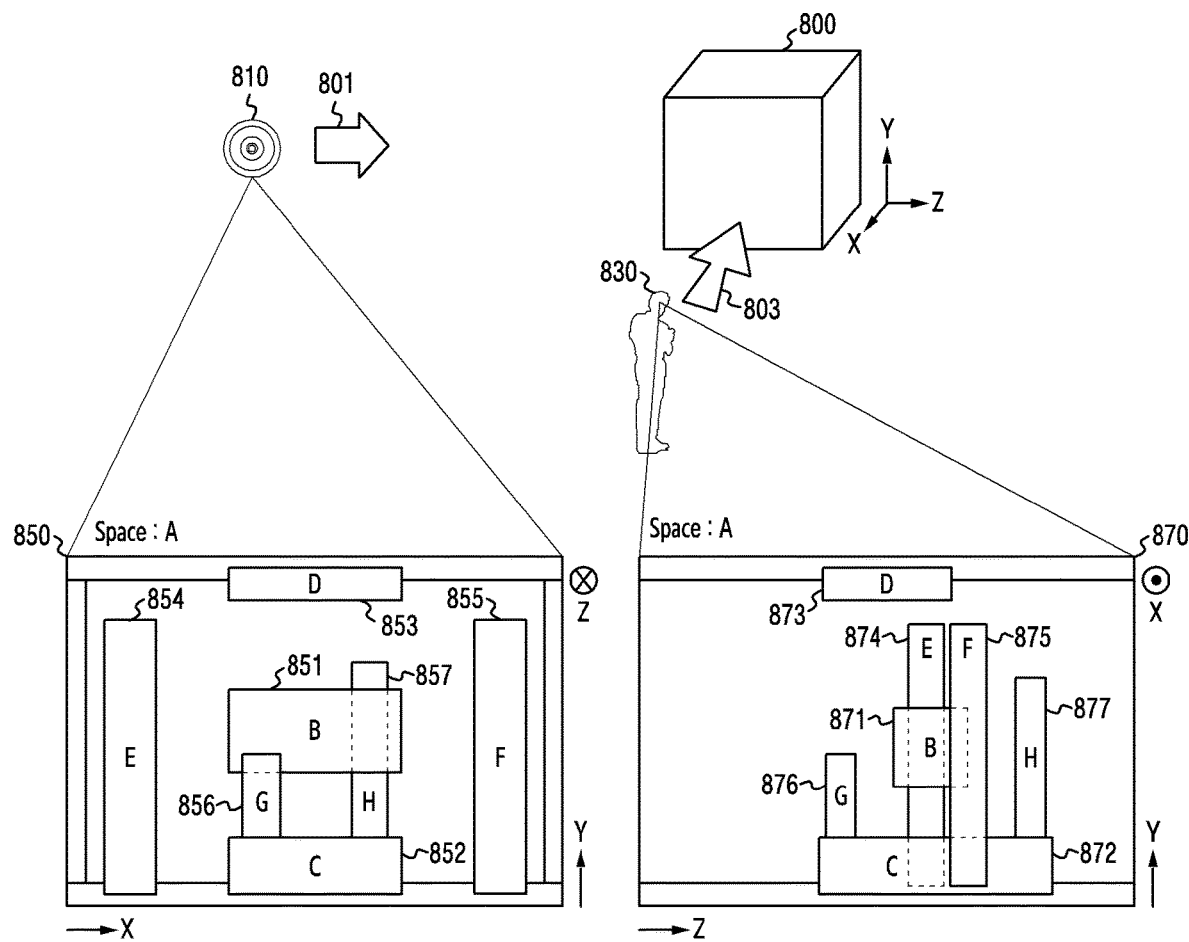
FIG. 8C is a diagram illustrating an example location relation between objects when a recognition direction of the objects and a gaze direction of the user are orthogonal to each other according to various embodiments of the disclosure.

FIG. 8B is a diagram illustrating example location relation between objects when a recognition direction of the objects and a gaze direction of the user are different from each other according to various embodiments of the disclosure. FIG. 8C is a diagram illustrating example location relation between objects when a recognition direction of the objects and a gaze direction of the user are orthogonal to each other according to various embodiments of the disclosure.

Referring to FIGS. 8A, 8B and 8C, the control module 200 of FIG. 2 may determine the location relation between the objects based on information on locations of a plurality of objects disposed within a specific space 800 (for example, space A). For example, the control module 200 may acquire a captured image from a camera device 810 capable of capturing the specific space 800, recognize objects within the image, and determine the location relation between the objects.

As illustrated in FIG. 8A, when a recognition direction (first direction) 801 (for example, a capturing direction of the camera device 810) of the objects is substantially the same as a gaze direction (second direction) 803 in which a user 830 views the specific space 800, the location relation between the objects disposed within the specific space 800 determined by the control module 200 may be the same as the location relation between the objects which the user 830 views (recognizes). For example, the location relation between a first object (B) 851, a second object (C) 852, a third object (D) 853, a fourth object (E) 854, a fifth object (F) 855, a sixth object (G) 856, and a seventh object (H) 857 in a first arrangement structure 850 of the specific space 800 recognized by the control module 200 may be the same as the location relation between a first object (B) 871, a second object (C) 872, a third object (D) 873, a fourth object (E) 874, a fifth object (F) 875, a sixth object (G) 876, and a seventh object (H) 877 in a second arrangement structure 870 of the specific space 800 viewed by the user 830.

In this connection, the case in which the first direction 801 and the second direction 803 are substantially the same as each other is described. It is assumed that a direction in which the camera device 810 captures a predetermined point of the specific space 800 at a predetermined height is the first direction 801 and a direction in which the user 830 views the same point of the specific space 800 at the same height is the second direction 803. Under such a condition, when a start point of a first vector, which is a unit vector having the first direction 801, matches a start point of a second vector, which is a unit vector having the second direction 803, and an angle between the first vector and the second vector is within a first angle range determined based on the first vector, it may be determined that the first direction 801 and the second direction 803 are substantially the same to each other. The first angle range may be, for example, from −45 degrees to +45 degrees that is a margin of error of 45 degrees from 0 degrees.

As illustrated in FIGS. 8B and 8C, when the first direction 801 is substantially different from the second direction 803, the location relation between the objects disposed within the specific space 800 determined by the control module 200 may be different from the location relation between the objects viewed (recognized) by the user 830.

For example, as illustrated in FIG. 8B, when the first direction 801 is substantially opposite to the second direction 803, the location relation between the objects in the first arrangement structure 850 of the specific space 800 recognized by the control module 200 may be completely opposite to the location relation between the objects in the second arrangement structure 870 of the specific space 800 viewed (recognized) by the user 830 such that leftward and rightward directions (X axis directions) and antero-posterior directions (Z axis directions) thereof are opposite to each other based on upward and downward directions (Y axis directions). In this case, the location relation between the objects determined by the control module 200 may be determined again based on a change in signs of an X axis coordinate value and a Z axis coordinate value of the objects, and thus may be corrected to be the same as the location relation between the objects viewed by the user 830. For example, as illustrated in FIG. 8B, when the coordinate value of the object in the first arrangement structure 850 is (X, Y, Z), the coordinate value of the same object in the second arrangement structure 870 may be (−X, Y, −Z). Accordingly, when the location relation between the objects is determined after the signs of the X axis coordinate value and the Z axis coordinate value are changed from the coordinate values of the objects in the first arrangement structure 850, the control module 200 may acquire the same result as that of the location relation between the objects in the second arrangement structure 870.

For example, when the coordinate value of the first object (B) 851 in the first arrangement structure 850 is (X1, Y1, Z1), the coordinate value of the fourth object (E) 854 is (X4, Y4, Z4), and the X axis coordinate value (X1) of the first object 851 is larger than the X axis coordinate value (X4) of the fourth object 854, the control module 200 may determine that the first object 851 is located on the right side of the fourth object 854. However, since the user 830 determines that the first object 871 is located on the left side of the fourth object 874 in the second arrangement structure 870, the control module 220 may perform a function of correcting the location relation. For example, the control module 200 may change the coordinate value of the first object 851 into (−X1, Y1, −Z1), change the coordinate value of the fourth object 854 into (−X4, Y4, −Z4), and then determine again the location relation between the first object 851 and the fourth object 854. Since the changed X axis coordinate value (−X) of the first object 851 is smaller than the X axis coordinate value (−X4) of the fourth object 854, the control module 200 may determine that the first object 851 is located on the right side of the fourth object 854.

In this connection, the case in which the first direction 801 and the second direction 803 are substantially opposite to each other is described. It is assumed that a direction in which the camera device 810 captures a predetermined point of the specific space 800 at a predetermined height is the first direction 801 and a direction in which the user 830 views the same point of the specific space 800 at the same height is the second direction 803. Under such a condition, when a start point of a first vector, which is a unit vector having the first direction 801, matches a start point of a second vector, which is a unit vector having the second direction 803, and an angle between the first vector and the second vector is within a second angle range determined based on the first vector, it may be determined that the first direction 801 and the second direction 803 are substantially opposite to each other. The second angle range may be, for example, from 135 degrees to 225 degrees that is a margin of error of 45 degrees from 180 degrees.

In another example, the case in which the first direction 801 is substantially perpendicular to the second direction 803 is may be divided into the case in which the second direction 803 is rotated about 90 degrees in a clockwise direction from the first direction 801 and the case in which the second direction 803 is rotated about 90 degrees in a counterclockwise direction from the first direction 801.

When the second direction 803 is rotated about 90 degrees in a clockwise direction from the first direction 801, a leftward and rightward direction in the second arrangement structure 870 may correspond to an antero-posterior direction (Z axis direction) in the first arrangement structure 850, and an antero-posterior direction in the second arrangement structure 870 may correspond to an opposite direction of a leftward and rightward direction (X axis direction) in the first arrangement structure 850. In this case, the location relation between the objects determined by the control module 200 may be corrected to be the same as the location relation between the objects viewed by the user 830 by performing redetermination after changing signs while changing X axis coordinate values of the objects to Z axis coordinate values and changing Z axis coordinate values to X axis coordinate values. For example, when the coordinate value of the object in the first arrangement structure 850 is (X, Y, Z), the coordinate value of the same object in the second arrangement structure 870 may be (Z, Y, -X). Accordingly, the control module 200 may acquire the same result as that of the location relation between the objects in the second arrangement structure 870 by determining the location relation between the objects after changing the signs while changing X axis coordinate values to Z axis coordinate values and changing Z axis coordinate values to X axis coordinate values in the coordinate values of the objects in the first arrangement structure 850.

For example, when the coordinate value of the first object (B) 851 in the first arrangement structure 850 is (X1, Y1, Z1), the coordinate value of the fifth object (F) 855 is (X5, Y5, Z5), the X axis coordinate value (X1) of the first object 851 is smaller than the X axis coordinate value (X5) of the fifth object 855, and the Z axis coordinate value (Z1) of the first object 851 is larger than the Z axis coordinate value (Z5) of the fifth object 854, the control module 200 may determine that the first object 851 is located on the front right side of the fifth object 855. However, since the user 830 determines that the first object 871 is located on the front right side of the fifth object 875 in the second arrangement structure 870, the control module 200 may perform a function of correcting the location relation. For example, the control module 200 may change the coordinate value of the first object 851 to (Z1, Y1, -X1), change the coordinate value of the fifth object 855 to (Z5, Y5, -X5), and then determine again the location relation between the first object 851 and the fifth object 855. The X axis coordinate value (Z1) of the first object 851 is larger than the changed X axis coordinate value (Z5) of the fifth object 855 and the Z axis coordinate value (-X1) of the first object 851 is larger than the changed Z axis coordinate value (-X5) of the fifth object 855, so that the control module 200 may determine that the first object 851 is located on the rear right side of the fifth object 855.

As illustrated in FIG. 8C, when the second direction 803 is rotated about 90 degrees in a counterclockwise direction from the first direction 801, a leftward and rightward direction in the second arrangement structure 870 may correspond to an antero-posterior direction (Z axis direction) in the first arrangement structure 850, and an antero-posterior direction in the second arrangement structure 870 may correspond to a leftward and rightward direction (X axis direction) in the first arrangement structure 850. In this case, the location relation between the objects determined by the control module 200 may be corrected to be the same as the location relation between the objects viewed by the user 830 by performing redetermination after changing X axis coordinate values of the objects to Z axis coordinate values and changing signs of Z axis coordinate values while changing the Z axis coordinate values to X axis coordinate values. For example, when the coordinate value of the object in the first arrangement structure 850 is (X, Y, Z), the coordinate value of the same object in the second arrangement structure 870 may be (-Z, Y, X). Accordingly, the control module 200 may acquire the same result as that of the location relation between the objects in the second arrangement structure 870 by determining the location relation between the objects after changing X axis coordinate values to Z axis coordinate values and changing Z axis coordinate values to X axis coordinate values in the coordinate values of the objects in the first arrangement structure 850.

For example, when the coordinate value of the first object (B) 851 in the first arrangement structure 850 is (X1, Y1, Z1), the coordinate value of the fifth object (F) 855 is (X5, Y5, Z5), the X axis coordinate value (X1) of the first object 851 is smaller than the X axis coordinate value (X5) of the fifth object 855, and the Z axis coordinate value (Z1) of the first object 851 is larger than the Z axis coordinate value (Z5) of the fifth object 854, the control module 200 may determine that the first object 851 is located on the front right side of the fifth object 855. However, since the user 830 determines that the first object 871 is located on the rear left side of the fifth object 875 in the second arrangement structure 870, the control module 200 may perform a function of correcting the location relation. For example, the control module 200 may change the coordinate value of the first object 851 to ((-Z1, Y1, X1), change the coordinate value of the fifth object 855 to ((-Z5, Y5, X5), and then determine again the location relation between the first object 851 and the fifth object 855. The X axis coordinate value (-Z1) of the first object 851 is smaller than the changed X axis coordinate value (-Z5) of the fifth object 855 and the changed Z axis coordinate value (X1) of the first object 851 is smaller than the changed Z axis coordinate value (X5) of the fifth object 855, so that the control module 200 may determine that the first object 851 is located on the rear left side of the fifth object 855.

In this connection, the case in which the first direction 801 and the second direction 803 are substantially orthogonal to each other is described. It is assumed that a direction in which the camera device 810 captures a predetermined point of the specific space 800 at a predetermined height is the first direction 801 and a direction in which the user 830 views the same point of the specific space 800 at the same height is the second direction 803. Under such a condition, when a start point of a first vector, which is a unit vector having the first direction 801, matches a start point of a second vector, which is a unit vector having the second direction 803, and an angle between the first vector and the second vector is within a third angle range determined based on the first vector, it may be determined that the first direction 801 and the second direction 803 are substantially orthogonal to each other. The third angle range may be, for example, from 45 degrees to 135 degrees which is a margin of error of 45 degrees from 90 degrees (the case in which the second direction 803 is rotated about 90 degrees in a counterclockwise direction from the first direction 801) and from 225 degrees from 315 degrees which is a margin of error of 45 degrees from 270 degrees (the case in which the second direction 803 is rotated about 90 degrees in a clockwise direction from the first direction 801). According to an embodiment, the third angle range may be configured from 46 degrees to 134 degrees and from 226 degrees to 314 degrees in consideration of an angle that overlaps the first angle range and the second angle range.

As described above, according to various example embodiments, an electronic device (for example, the electronic device 101) may include: a communication circuit (for example, the communication circuit 190) configured to communicate with an external electronic device, a processor (for example, the processor 120) operatively connected to the communication circuit, and a memory (for example, the memory 130) operatively connected to the processor, wherein the memory stores instructions which, when executed, cause the processor to control the electronic device to: acquire first information on types of a plurality of objects disposed within a first space and second information on locations of the plurality of objects in a first direction for the first space, select a target object to be named among the plurality of objects, generate at least one first name of the target object based on information on a type of the target object in the first information, generate at least one second name of at least one counterpart object based on information on a type of the counterpart object disposed around the target object in the first information, determine a relative location relation between the target object and the at least one counterpart object based on the second information, and generate at least one third name of the target object based on the at least one first name, the at least one second name, and the relative location relation between the target object and the at least one counterpart object.

According to various example embodiments, the instructions, when executed, may cause the processor to control the electronic device to: acquire an image obtained by capturing the first space in the first direction from the external electronic device including a camera capable of capturing the first space through the communication circuit and acquire the first information and the second information by analyzing the image.

According to various example embodiments, the electronic device may further include a camera (for example, the camera module 180), wherein the instructions, when executed, cause the processor to control the electronic device to: acquire an image obtained by capturing the first space in the first direction through the camera and acquire the first information and the second information by analyzing the image.

According to various example embodiments, the instructions, when executed, may cause the processor to control the electronic device to: determine a second direction in which a user views the first space based on the first direction and the second direction being substantially different from each other based on the determined result, correct a coordinate value of the target object included in the second information and a coordinate value of the at least one counterpart object, and re-determine the relative location relation between the target object and the at least one counterpart object based on the corrected coordinate value of the target object and the corrected coordinate value of the at least one counterpart object.

According to various example embodiments, the instructions may, when executed, cause the processor to control the electronic device to: based on it being determined that the first direction and the second direction are substantially opposite to each other, change signs of an X axis coordinate value and a Z axis coordinate value in the coordinate value of the target object and the coordinate value of the at least one counterpart object included in the second information and correct the coordinate value of the target object and the coordinate value of the at least one counterpart object.

According to various example embodiments, the instructions, when executed, may cause the processor to control the electronic device to: based on it being determined that the second direction corresponds to a direction rotated about 90 degrees from the first direction in a clockwise direction, change an X axis coordinate value to a Z axis coordinate value while changing a sign of the X coordinate value and change a Z axis coordinate value to an X axis coordinate value in the coordinate value of the target object and the coordinate value of the at least one counterpart object included in the second information to correct the coordinate value of the target object and the coordinate value of the at least one counterpart object.

According to various example embodiments, the instructions, when executed, may cause the processor to control the electronic device to: based on it being determined that the second direction corresponds to a direction rotated about 90 degrees from the first direction in a counterclockwise direction, change an X axis coordinate value to a Z axis coordinate value and change a Z axis coordinate value to an X axis coordinate value while changing a sign of the Z axis coordinate value in the coordinate value of the target object and the coordinate value of the at least one counterpart object included in the second information, to correct the coordinate value of the target object and the coordinate value of the at least one counterpart object.

According to various example embodiments, the instructions, when executed, may cause the processor to control the electronic device to transmit the at least one third name to the external electronic device through the communication circuit.

According to various example embodiments, the electronic device may further include a microphone, wherein the instructions, when executed, may cause the processor to control the electronic device to: acquire a voice instruction of a user through the microphone, perform voice recognition on the voice instruction, identify the target object based on a name-related expression included in a result of the voice recognition, determine a direction or a location to perform a function of the target object based on a function-related expression included in the result of the voice recognition, and transmit a signal related to the function of the target object and the direction or the location to perform the function of the target object to the target object through the communication circuit.

As described above, according to various example embodiments, an electronic device (for example, the electronic device 101) may include a camera (for example, the camera module 180), a communication circuit (for example, the communication module 190), a processor (for example, the processor 120) operatively connected to the camera and the communication circuit, and a memory (for example, the memory 130) operatively connected to the processor, wherein the memory stores instructions which, when executed, cause the processor to control the electronic device to: acquire a first image related to a first space in which at least one external electronic device is disposed through the camera or the communication circuit, acquire first information related to a type of the at least one external electronic device disposed within the first space and second information related to a location of the at least one external electronic device in a first direction for the first space by analyzing the first image, generate a name of the at least one external electronic device based on the first information, determine a location relation between the electronic device and the at least one external electronic device based on the second information, and generate a name of the at least one external electronic device based on at least some of the first information and the second information.

According to various example embodiments, the instructions, when executed, may cause the processor to control the electronic device to: acquire a second image including a user through the camera or the communication circuit, determine a second direction in which the user views the first space by analyzing the second image, and correct a location relation of the at least one external electronic device included in the second information based on the first direction and the second direction being substantially different from each other based on a result of the determination.

According to various example embodiments, the instructions, when executed, may cause the processor to control the electronic device to: based on the first direction and the second direction being substantially opposite to each other, based on the result of the determination, change signs of an X axis coordinate value and a Z axis coordinate value in a coordinate value of the at least one external electronic device included in the second information to correct the location relation of the at least one external electronic device.

According to various example embodiments, the instructions, when executed, may cause the processor to control the electronic device to: based on the second direction being rotated about 90 degrees from the first direction in a clockwise direction, based on the result of the determination, change an X axis coordinate value to a Z axis coordinate value while changing a sign of the X coordinate value and change a Z axis coordinate value to an X axis coordinate value object in a coordinate value of the at least one external electronic device included in the second information to correct the location relation of the at least one external electronic device.

According to various example embodiments, the instructions, when executed, may cause the processor to control the electronic device to: based on the second direction being rotated about 90 degrees from the first direction in a counterclockwise direction, based on the result of the determination, change an X axis coordinate value to a Z axis coordinate value and change a Z axis coordinate value to an X axis coordinate value while changing a sign of the Z axis coordinate value in a coordinate value of the at least one external electronic device included in the second information to correct the location relation of the at least one external electronic device.

Figure 9:
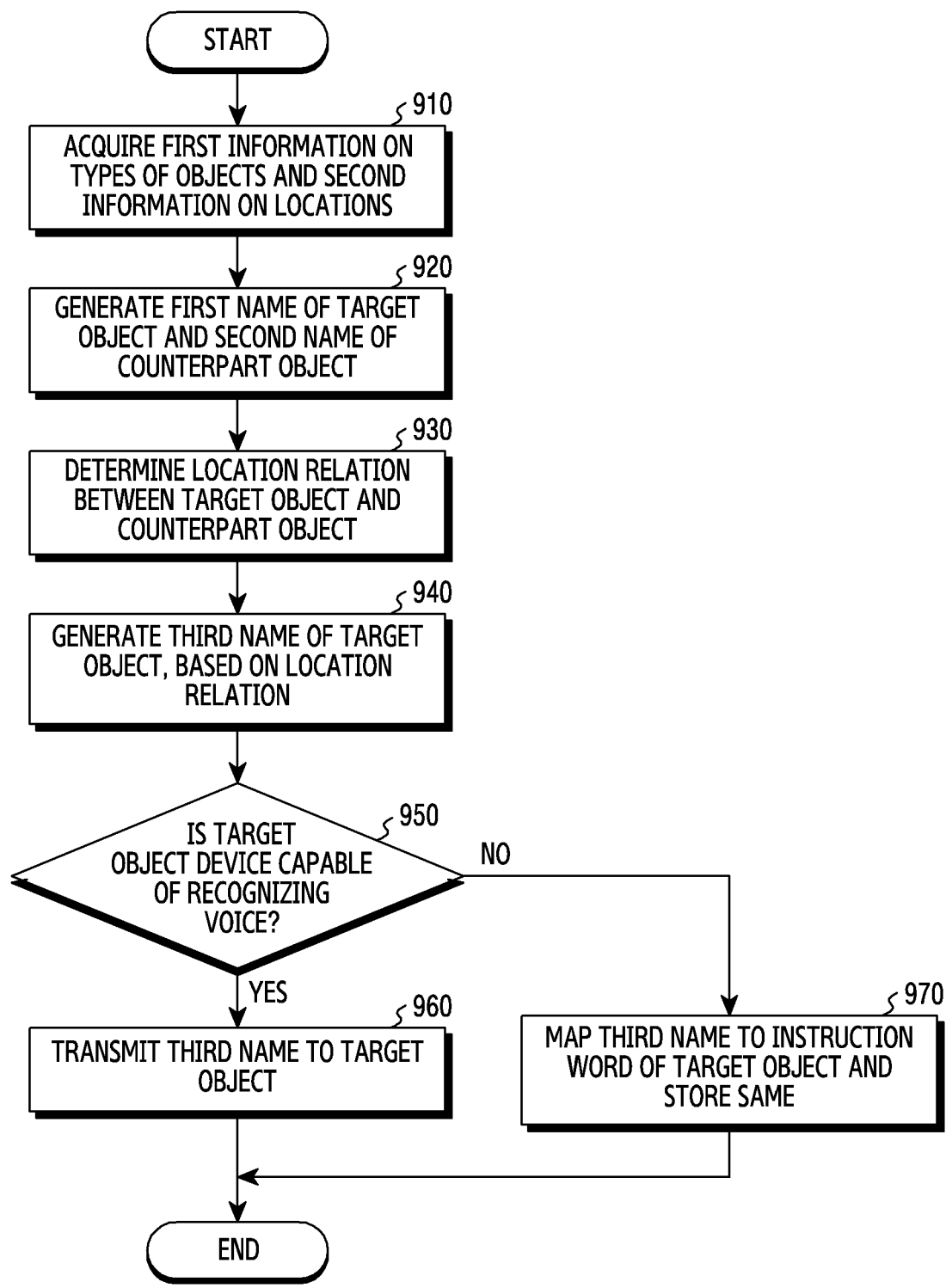
FIG. 9 is a flowchart illustrating an example naming method in an environment in which an electronic device which is a target to be named is separate from an electronic device for generating a name according to various embodiments of the disclosure.

FIG. 9 is a flowchart illustrating an example naming method in an environment in which an electronic device which is a target to be named is separate from an electronic device for generating a name according to various embodiments of the disclosure.

Referring to FIG. 9, the electronic device 101 (for example, the first electronic device 410 of FIGS. 4A and 4B or the fourth electronic device 470 of FIGS. 4E and 4F) including at least some of the control module 200 (for example, the object recognition unit 210, the spatial information acquisition unit 230, the location relation determination unit 250, and the name generation unit 270) may acquire first information on types of objects disposed within a specific space and second information on locations of the objects through the object recognition unit 210 of the control module 200 in operation 910. For example, the object recognition unit 210 may determine types and locations of the objects disposed within the specific space in an image recognition method, a radio wave/sound wave recognition method, or a method such as recognition through an IoT system and acquire the first information on the types of the objects and the second information on the locations of the objects.

The name generation unit 270 of the control module 200 may select an electronic device (for example, the second electronic device 450 of FIGS. 4A, 4B, 4E, and 4F) to be named among the objects as a target object and select an object existing around the target object as a counterpart object. In operation 920, the name generation unit 270 may generate a first name of the target object and a second name of the counterpart object. For example, the name generation unit 270 may generate the first name of the target object based on information on the type of the target object in the first information and generate the second name of the counterpart object based on information on the type of the counterpart object in the first information. The name generated based on the type of the object may correspond to a default name generally referring to the object. For example, in the image recognition method, default names of the target object and the counterpart object may be generated based on object recognition through image analysis.

In operation 930, the location relation determination unit 250 of the control module 200 may determine the location relation between the target object and the counterpart object. The location relation determination unit 250 may determine the location relation between the target object and the counterpart object based on the second information on the locations of the objects. For example, the location relation determination unit 250 may determine the location relation between the objects based on a relational reasoning network algorithm that is a deep-learning technology for extracting the relation between the objects in the image obtained by capturing the specific space. The second information on the locations of the objects may be used as learning data for determining the location relation between the objects.

In operation 940, the name generation unit 270 may generate a third name of the target object based on the first name of the target object, the second name of the counterpart object, and the location relation between the target object and the counterpart object. For example, the name generation unit 270 may generate the third name by sequentially combining the second name, the expression indicating the location relation, and the first name. The name generation unit 270 may add an expression indicating a state while generating the third name. For example, the third name may include the expression such as "exist", "is disposed", or "is located" indicating the presence state or the expression such as "does not exist", "is not disposed", or "is not located" indicating the absence state. For example, when the target object is a stand lamp and a TV located on the left side of the stand lamp is the counterpart object, the name generation unit 270 may generate the first name of the target object as the "stand lamp", generate the second name of the counterpart object as the "TV", and generate the third name of the target object based on the location relation between the target object and the counterpart object as the "stand existing on the right side of the TV".

In operation 950, the control module 200 may determine whether the target object is a device capable of performing voice recognition. For example, the control module 200 may determine whether the target object includes a microphone and has a voice recognition solution.

When the target object is the device capable of performing the voice recognition (for example, when the target object includes the instruction processing unit 290 of the control module 200), the control module 200 may transmit the generated third name of the target object to the target object in operation 960. Accordingly, when the user speaks the third name, the target object may perform voice recognition on a user's voice input. When the voice recognition result includes the third name, the target object may be activated and perform a function corresponding to a specific instruction included in the voice recognition result. According to various embodiments, the control module 200 may transmit the first name of the target object to the target object along with the third name.

When the target object is not a device capable of performing voice recognition (for example, the target object does not include the instruction processing unit 290 of the control module 200), the control module 200 may map the generated third name of the target object to an instruction word indicating the target object and store the same in the memory 130 in operation 970. Accordingly, when the user speaks the third name, voice recognition is performed on the user's voice input received through the microphone of the electronic device 101. When the voice recognition result includes the third name, the instruction word mapped to the third name may be searched for in the memory 130 and an activation signal may be transmitted to the target object of the found instruction. When the voice recognition result includes an instruction for performing a specific function, a signal corresponding to the instruction may be transmitted to the target object. According to some embodiments, the control module 200 may map the first name of the target object to the instruction word indicating the target object along with the third name and store the same in the memory 130.

According to an embodiment, the electronic device 101 may omit operation 950. For example, when the electronic device 101 is a device (for example, an IoT hub device for controlling IoT devices) for controlling the target object, the electronic device 101 may perform operation 970 without operation 950. In another example, when the electronic device 101 is a device (for example, a smart phone) connected to the device (for example, the IoT hub device) for controlling the target object, the electronic device 101 may transmit the third name (and the first name) of the target object to the device (for example, the IoT hub device) for controlling target object in operation 970 without operation 950. The electronic device 101 may transmit information on the target object (for example, the type and location of the target object, the location relation with a neighboring object, or information on a space in which the target object is disposed) to the device for controlling the target object.

Figure 10:
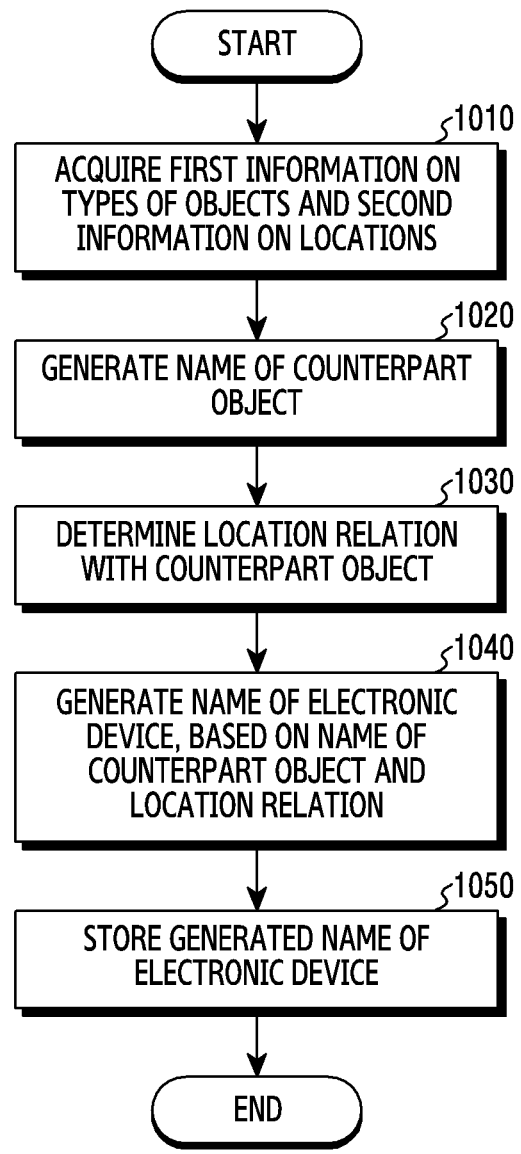
FIG. 10 is a flowchart illustrating an example naming method in an environment in which an electronic device to be named directly generates a name according to various embodiments of the disclosure.

FIG. 10 is a flowchart illustrating an example naming method in an environment in which an electronic device to be named directly generates a name according to various embodiments of the disclosure.

Referring to FIG. 10, the electronic device 101 (for example, the second electronic device 450 of FIGS. 4C and 4D) including the control module 200 may acquire first information on a type of a counterpart object disposed within a specific space and second information on a location thereof through the object recognition unit 210 of the control module 200 in operation 1010. For example, the object recognition unit 210 may determine the type and location of the counterpart object disposed within the specific space in an image recognition method, a radio wave/sound wave recognition method, or a method through an IoT system and acquire first information on the type of the counterpart object and second information on the location of the counterpart object. According to an embodiment, when the electronic device 101 does not directly acquire the first information and the second information through an element (for example, a camera) included in the electronic device 101, the first information may include information on the type of the electronic device 101, and the second information may include information on the location of the electronic device 101.

In operation 1020, the name generation unit 270 of the control module 200 may generate a name of the counterpart object. For example, the name generation unit 270 may generate the name of the counterpart object based on the first information on the type of the counterpart object. The name generated based on the type of the object may correspond to a default name generally referring to the object. According to an embodiment, the control module 200 may acquire the default name of the electronic device 101 from the memory 130 or, when the first information includes information on the type of the electronic device 101, may generate the default name of the electronic device 101 based on the first information.

In operation 1030, the location relation determination unit 250 of the control module 200 may determine the location relation with the counterpart object. The location relation determination unit 250 may determine the location relation between the electronic device 101 and the counterpart object based on the second information on the location of the counterpart object. The second information may include information on the location of the electronic device 101. When the second information does not include the information on the location of the electronic device 101, for example, when the electronic device 101 directly acquires the second information through an element (for example, a camera) included in the electronic device 101, the second information is acquired based on the location of the electronic device 101, so that the location relation determination unit 250 may determine the location relation between the electronic device 101 and the counterpart object based on the second information acquired based on the location of the electronic device 101.

In operation 1040, the name generation unit 270 may generate the name of the electronic device 101 based on the name of the counterpart object and the location relation with the counterpart object. For example, the name generation unit 270 may generate the name of the electronic device 101 by sequentially combining the name of the counterpart object, the expression indicating the location relation, and the default name of the electronic device 101. The name generation unit 270 may add an expression indicating a state while generating the name of the electronic device 101. For example, the name of the electronic device 101 may include the expression such as "exist", "is disposed", or "is located" indicating the presence state or the expression such as "does not exist", "is not disposed", or "is not located" indicating the absence state.

In operation 1050, the control module 200 may store the generated name of the electronic device 101 in the memory 130. Accordingly, when the user speaks the name of the electronic device 101, the electronic device 101 may perform voice recognition on a user's voice input received through a microphone of the electronic device 101 and, when the voice recognition result includes the name of the electronic device 101, may be activated and perform a function corresponding to a specific instruction included in the voice recognition result. According to some embodiments, the control module 200 may map the generated name of the electronic device 101 to the pre-stored default name of the electronic device 101 and store the same in the memory 130.

According to an example embodiment, when the name of the target object is generated based on the location relation with the counterpart object and then at least one of the location of the target object or the location of the counterpart object is changed through the operations of FIGS. 9 and 10, the control module 200 may determine again the location relation between the target object and the counterpart object based on the changed location and generate again (update) the name of the target object based on the re-determined location relation.

According to an example embodiment, the control module 200 may periodically identify whether the location of the target object or the location of the counterpart object is changed. According to various embodiments, the control module 200 may receive an event indicating that the location of the target object or the location of the counterpart object is changed from a server or an external electronic device and thus recognize the change in the location of the target object or the location of the counterpart object.

According to an example embodiment, when a new object is found (recognized), the control module 200 may configure the new object as a counterpart object and determine the location relation with the target object. For example, when the new object (electronic device) is connected through a communication circuit (for example, the communication module 190), the control module 200 may recognize the new object.

Figure 11:
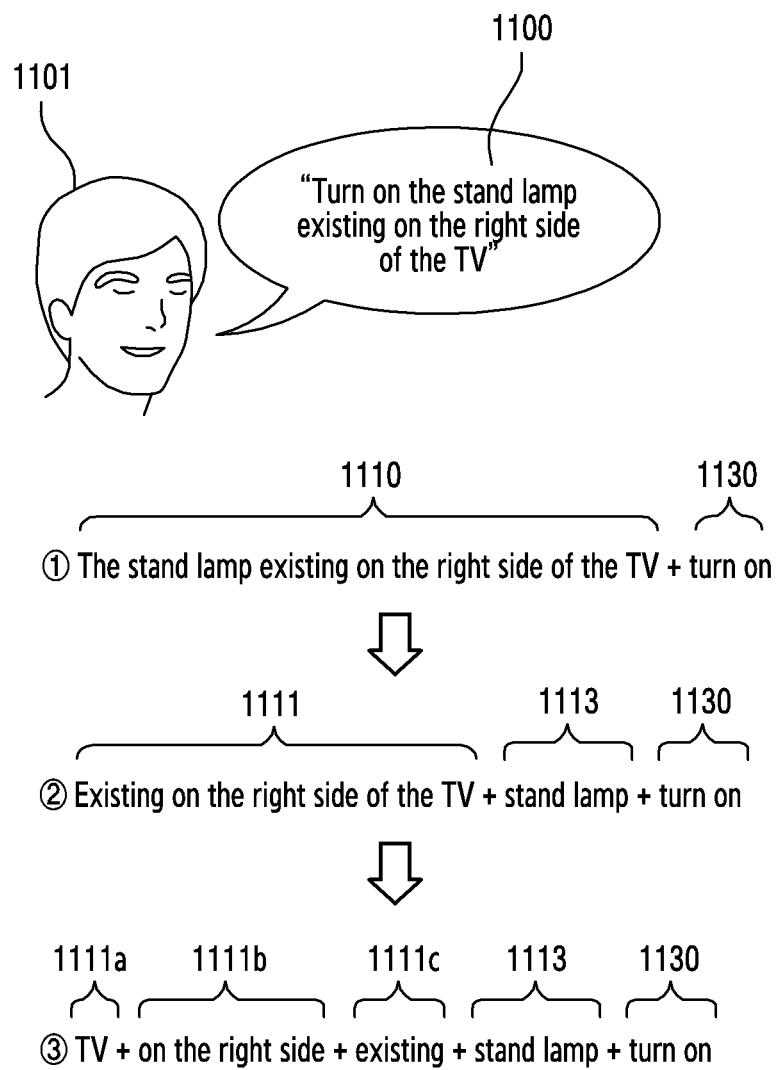
FIG. 11 is a diagram illustrating an example voice recognition function for a user's voice input according to various embodiments of the disclosure.
Figure 12:
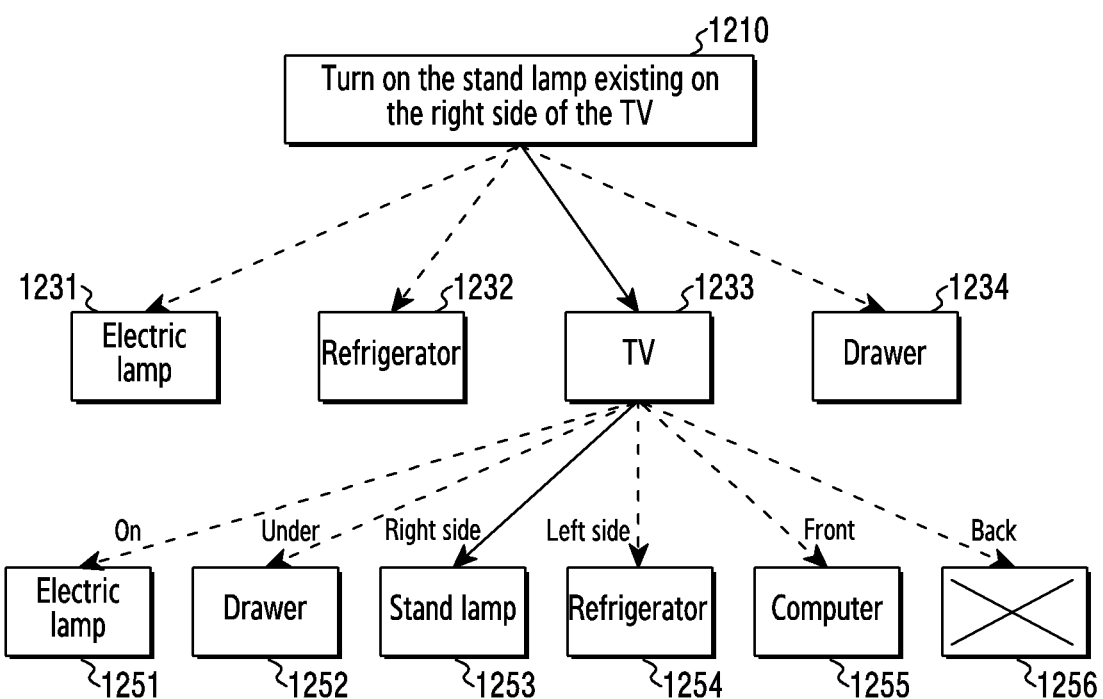
FIG. 12 is a diagram illustrating an example function of identifying an electronic device through a name of the electronic device according to various embodiments of the disclosure.

FIG. 11 is a diagram illustrating an example voice recognition function for a user's voice input according to various embodiments of the disclosure. FIG. 12 is a diagram illustrating an example function of identifying an electronic device through a name of the electronic device according to various embodiments of the disclosure.

Referring to FIGS. 11 and 12, the electronic device 101 including a microphone and having a voice recognition solution (for example, including the instruction processing unit 290 of the control module 200) may perform voice recognition on a voice input 1100 of a user 1101. According to an embodiment, the electronic device 101 may convert the voice input 1100 (for example, voice data) into text data. For example, the electronic device 101 may convert the voice input into text data based on an acoustic model and a language model. The acoustic model may include information related to speaking, and the language model may include unit phoneme information and information on a combination of unit phoneme information. Information on the acoustic model and the language model may be stored in the memory 130 in the form of a database.

According to an embodiment, the electronic device 101 may tag keywords in the text data and classify in detail the meaning of speaking based on tagging information. For example, the electronic device 101 may extract a name-related expression from the text data and extract meaningful tagging information from the name-related expression.

When the user 1101 speaks "turn on the stand lamp existing on the right side of the TV", the instruction processing unit 290 may convert the voice input of the user into text data ("turn on the stand lamp existing on the right side of the TV"). Further, the instruction processing unit 290 may extract a name-related expression 1110 from the text data. For example, the instruction processing unit 290 may extract the name-related expression 1110 (for example, "the stand lamp existing on the right side of the TV") separately from a function-related expression 1130 (for example, "turn on") from the text data. Further, the instruction processing unit 290 may extract meaningful tagging information from the name-related expression 1110. For example, the instruction processing unit 290 may extract a name 1113 (for example, "stand lamp") of the target object to perform the function and an expression 1111 (for example, "existing on the right side of the TV") additionally explaining the target object from the name-related expression 1110. The name 1113 of the target object may be a default name configured based on the type of the target object. Further, the expression 1111 additionally explaining the target object may include an expression describing a spatial location of the target object and a relative location to a neighboring object. The instruction processing unit 290 may extract a name 1111a (for example, "TV") of the counterpart object, an expression 1111b (for example, "on the right side") indicating the location relation between the target object and the counterpart object, and an expression 1111c (for example, "existing") indicating a state from the expression 1111 additionally explaining the target object.

According to an embodiment, the instruction processing unit 290 may extract meaningful tagging information from the function-related expression 1130. For example, the instruction processing unit 290 may extract an instruction for performing the function and an expression describing a direction or location for the function from the function-related expression 1130. The expression describing the direction or location for the function may include, for example, an expression indicating an absolute direction or an absolute location (for example, space name) indicating fixed information of an area (or space) based on the location of the target object or an expression indicating a relative direction or a relative location based on the location relation with a neighboring object. FIG. 11 illustrates a state in which the function-related expression 1130 includes a specific instruction.

According to an embodiment, the instruction processing unit 290 may detect an intention of the user 1101 based on classified tagging information. For example, the instruction processing unit 290 may search for a target object and a counterpart object suitable for the intention of the user 1101 in the table 700 storing the information 710 of the target object, the information 730 on the counterpart object, and the information 750 on the location relation between the target object and the counterpart object, which are mapped to each target object and each counterpart object, and accurately detect the intention of the user 1101 based on the found target object and counterpart object and the mapped information on the location relation as illustrated in FIG. 7.

For a function of detecting the intention of the user 1101, a decision tree algorithm may be used as illustrated in FIG. 12. For example, the instruction processing unit 290 may search for a first item 1233 corresponding to the name 1111a (for example, "TV") of the counterpart object included in text data 1210 corresponding to the voice input of the user 1101 among first items 1231, 1232, 1233, and 1234 corresponding to the counterpart objects of the table 700, search for a second item 1253 corresponding to the expression 1111b (for example, "on the right side") indicating the location relation among second items 1251, 1252, 1253, 1254, 1255, and 1256 mapped to the first item 1233, identify whether the found second item 1253 corresponds to the name 1113 (for example, "stand lamp") of the target object, and when the second item 1253 corresponds thereto, detect the target object suitable for the intention of the user 1101. According to some embodiments, the instruction processing unit 290 may increase the accuracy using a random forest algorithm in order to reduce noise generated during a learning process.

Figure 13:
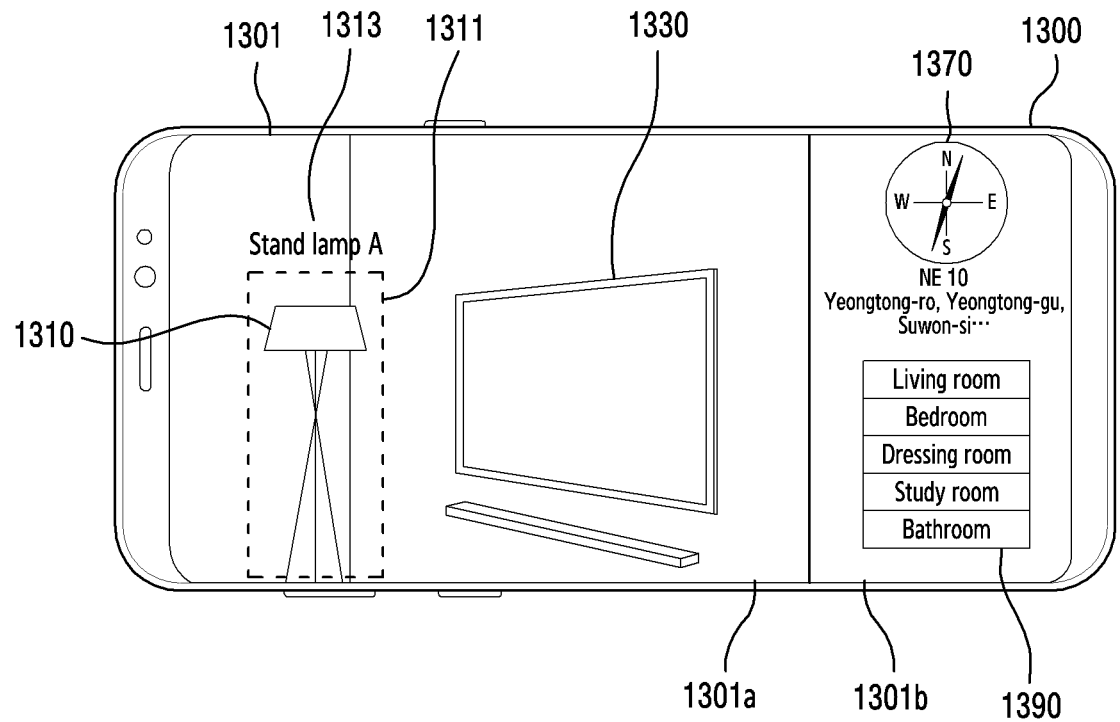
FIG. 13 is a diagram illustrating an example screen describing an object recognition method according to various embodiments of the disclosure.

FIG. 13 is a diagram illustrating an example screen describing an object recognition method according to an embodiment of the disclosure.

Referring to FIG. 13, an electronic device 1300 (for example, the electronic device 101) including the control module 200 may recognize objects in a specific space through the object recognition unit 210 of the control module 200. For example, the object recognition unit 210 may determine types of objects in the specific space and locations of the objects in the specific space.

According to an embodiment, in the state in which the electronic device 1300 displays an image obtained by capturing the specific space on a display 1301, the object recognition unit 210 may apply a graphic effect to the image in order to distinguish a target object to be named among the recognized objects from neighboring objects. For example, in the state in which an image including a target object 1310 and a neighboring object 1330 is output to the display 1301, the object recognition unit 210 may display a text object 1313 indicating information (for example, device type) of the target object 1310 near the target object 1310 and display a box object 1311 indicating an edge or a separation area of the target object 1310 around the target object 1310.

According to an embodiment, the electronic device 1300 may output an image obtained by capturing the specific space in a first area 1301a (for example, left area) of the display 1301 and output a capturing direction of the mage and information on the specific space in a second area 1301b (for example, right area) of the display 1301. For example, the electronic device 1300 may output a compass object 1370 indicating the capturing direction of the image and a list object 1390 including space names to configure the space names of the specific space in the second area 1301b.

Figure 14:
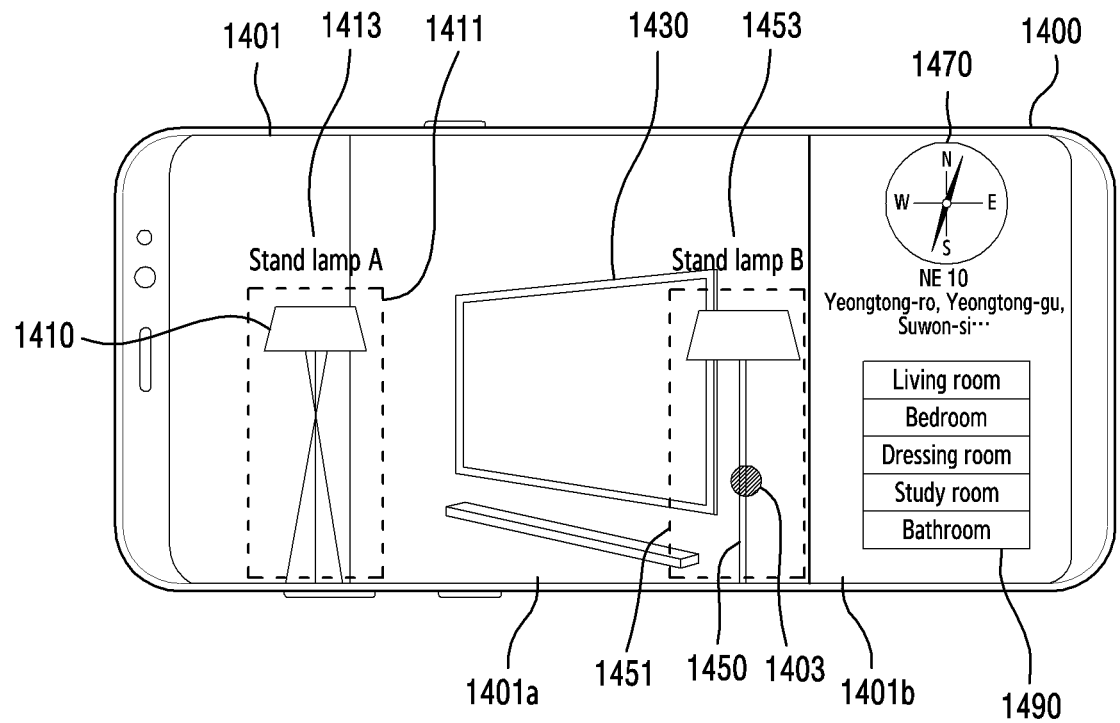
FIG. 14 is a diagram illustrating an example screen describing a method of selecting a target to be named or controlled according to various embodiments of the disclosure.

FIG. 14 is a diagram illustrating an example screen describing a method of selecting a target to be named or controlled according to an embodiment of the disclosure.

Referring to FIG. 14, an electronic device 1400 (for example, the electronic device 101) including the control module 200 may recognize objects in a specific space through the object recognition unit 210 of the control module 200. For example, the object recognition unit 210 may determine types of objects in the specific space and locations of the objects in the specific space.

According to an embodiment, in the state in which the electronic device 1400 outputs an image obtained by capturing the specific space to a display 1401, the object recognition unit 210 may apply a graphic effect to the image to distinguish a target object to be named or controlled among recognized objects from neighboring objects. For example, while displaying a first object 1410, a second object 1430, and a third object 1450 on the display 1401, the object recognition unit 210 may display a text object 1413 indicating information on the first object 1410 near the first object 1410, a box object 1411 indicating an edge or a separation area of the first object 1410 near the first object 1410, a text object 1453 indicating information on the third object 1450 near the third object 1450, and a box object 1451 indicating an edge or a separation area of the third object 1450 near the third object 1450.

According to an embodiment, when a plurality of electronic devices which are the same type or perform the same function exist in the specific space, the electronic device 101 may perform a function of selecting one of the electronic devices as the target object to be named or controlled. For example, the electronic device 1400 may select the target object through a user input 1403. For example, upon receiving the user input 1403 for selecting the third object 1450, the electronic device 101 may select the selected third object 1450 as the target object. In this case, the electronic device 101 may release the graphic effect applied to the first object 1410 which is excluded from the selection of the target object. For example, the electronic device 101 may omit the text object 1413 indicating information on the first object 1410 and the box object 1411 indicating the edge or the separation area of the first object 1410 from the display 1401. Accordingly, it is possible to induce the user to accurately select the electronic device to be named or the electronic device to be controlled from a plurality of electronic devices which are the same type or perform the same function.

According to an embodiment, the electronic device 1400 may output an image obtained by capturing the specific space in a first area 1401a (for example, left area) of the display 1401 and output a capturing direction of the image and information on the specific space in a second area 1401b (for example, right area) of the display 1401. For example, the electronic device 1400 may output a compass object 1470 indicating the capturing direction of the image and a list object 1490 including space names to configure the space names of the specific space in the second area 1401b.

Figure 15:
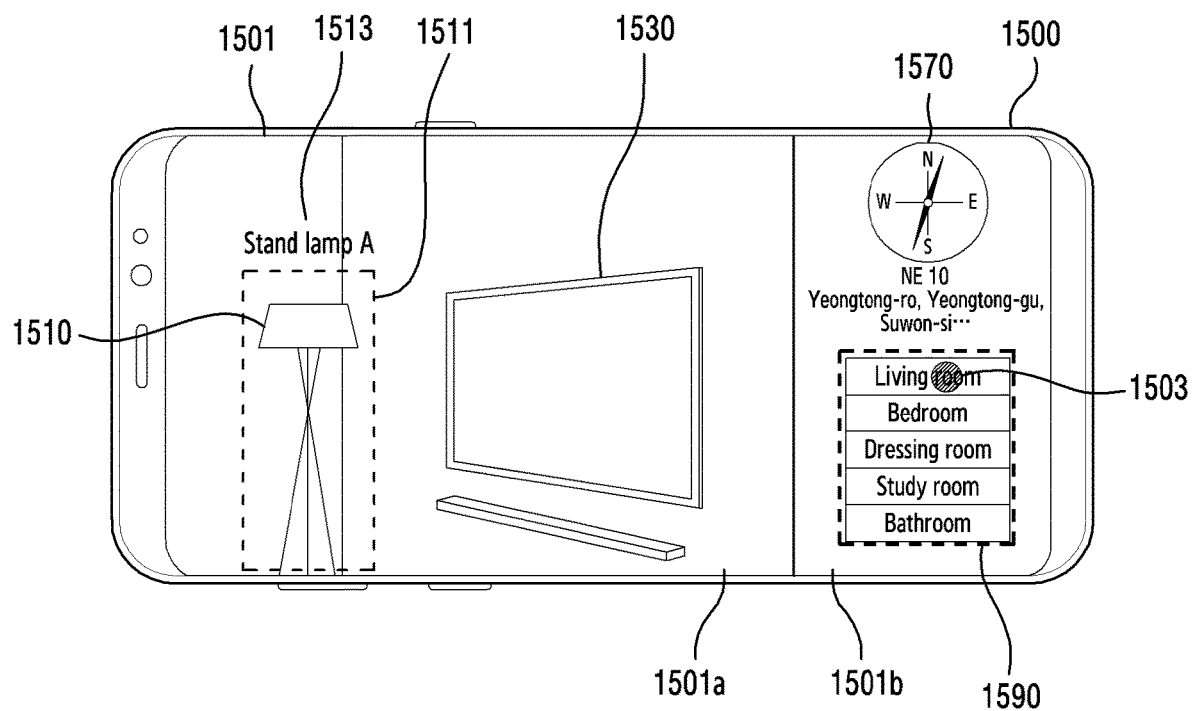
FIG. 15 is a diagram illustrating an example screen describing a method of configuring spatial information of the object according to various embodiments of the disclosure.

FIG. 15 is a diagram illustrating an example screen describing a method of configuring spatial information of the object according to an embodiment of the disclosure.

Referring to FIG. 15, an electronic device 1500 (for example, the electronic device 101) including the control module 200 may recognize objects in a specific space through the object recognition unit 210 of the control module 200. For example, the object recognition unit 210 may determine types of objects in the specific space and locations of the objects in the specific space.

According to an embodiment, in the state in which the electronic device 1500 displays an image obtained by capturing the specific space on a display 1501, the object recognition unit 210 may apply a graphic effect to the image in order to distinguish a target object to be named among the recognized objects from neighboring objects. For example, while displaying a first object 1510 and a second object 1530 on a display 1501, the object recognition unit 210 may display a text object 1513 indicating information on the first object 1510 near the first object 1510 and a box object 1511 indicating an edge or a separation area of the first object 1510 near the first object 1510. Further, while outputting the image obtained by capturing the specific space in a first area 1501a (for example, left area) of the display 1501, the electronic device 1500 may output the capturing direction of the image and the information on the specific space in a second area 1501b (for example, right area) of the display 1501. For example, the electronic device 1500 may output a compass object 1570 indicating the capturing direction of the image and a list object 1590 including space names to configure the space names of the specific space in the second area 1501b.

According to an embodiment, the spatial information acquisition unit 230 of the control module 200 may acquire spatial information of the specific space in which objects recognized through the object recognition unit 210 are disposed. For example, the spatial information acquisition unit 230 may acquire a space name of the specific space among the spatial information through a user's input 1503. For example, when the user selects one item from a list object 1590 including space names to configure the space names of the specific space displayed on the display 1501, the space name corresponding to the selected item may be configured as the space name of the specific space.

According to an embodiment, the control module 200 may provide a UI to allow the user to directly input the space name. For example, the control module 200 may output a text field object (not shown) into which the space name can be input in the second area 1501b.

According to an embodiment, space names included in the list object 1590 may be determined based on at least one piece of structure information determined based on shapes and locations of the structures included in the space and arrangement information including types and locations of objects disposed within the space. For example, when it is determined that the space is a space included in a house based on at least one piece of the structure information and the arrangement information, the control module 200 may configure space names included in the list object 1590 as names of normal spaces (for example, living room, bathroom, kitchen, or bedroom) included in the house. According to another embodiment, the space names included in the list object 1590 may be configured as space names which the user previously input. For example, the control module 200 may configure space names included in the list object 1590 as space names which the user inputs through the text field object.

Figure 16:
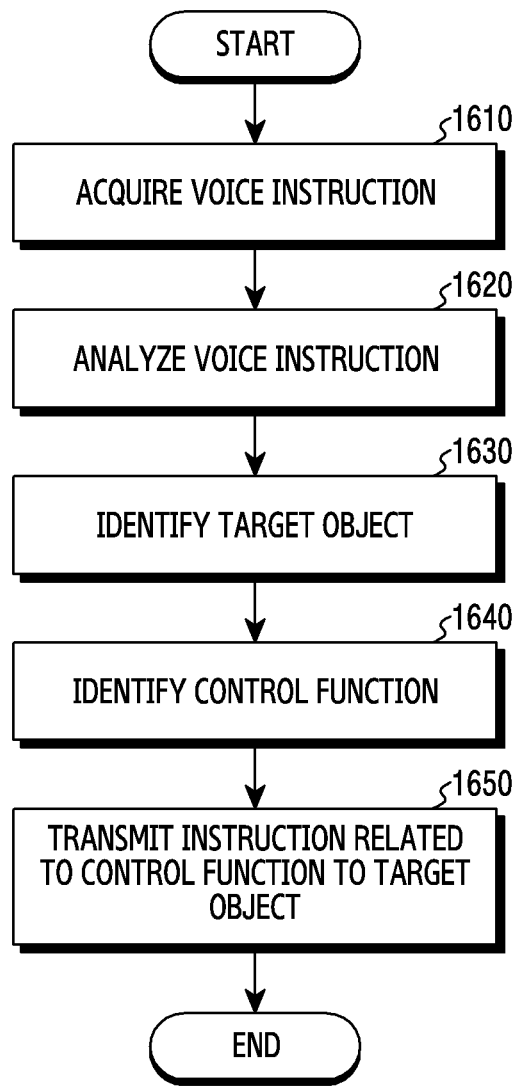
FIG. 16 is a flowchart illustrating an example method of controlling an external electronic device according to various embodiments of the disclosure.

FIG. 16 is a flowchart illustrating an example method of controlling an external electronic device according to various embodiments of the disclosure.

Referring to FIG. 16, the electronic device 101 (for example, the first electronic device 410 of FIGS. 4A, 4B, 4E, and 4F) may include at least some (for example, the instruction processing unit 290) of the control module 200. In operation 1610, the instruction processing unit 290 of the control module 200 may acquire a voice instruction received through a microphone of the electronic device 101.

In operation 1620, the instruction processing unit 290 may analyze the voice instruction. According to an embodiment, the instruction processing unit 290 may convert the voice instruction into text data by performing voice recognition on the voice instruction and extract a name-related expression and a function-related expression from the text data.

In operation 1630, the instruction processing unit 290 may recognize (identify) a target object (external electronic device) to be controlled. According to an embodiment, the instruction processing unit 290 may identify the target object based on the name-related expression extracted from the text data. The name-related expression may include a name (default name) generated based on the type of the target object, a name (first location relation-related descriptive name) generated based on the location relation with a neighboring object, a name (space-based descriptive name) generated based on a space name of the space in which the target object is disposed, or a name (second location relation-based descriptive name) generated based on the location relation with a structure included in the space in which the target object is disposed.

According to an embodiment, the instruction processing unit 290 may identify the target object based on a database storing information on objects (for example, names, types, and locations of the objects, the location relation with neighboring objects, or information on the space in which the objects are disposed). The database may be stored in the memory 130 of the electronic device 101 or stored in a memory of an external electronic device (for example, the electronic device 102, the electronic device 104, or the server 108) capable of communicating with the electronic device 101.

When the target object is identified, the instruction processing unit 290 may identify a control function in operation 1640. According to an embodiment, the instruction processing unit 290 may identify the control function based on the function-related expression extracted from the text data. The function-related expression may include an instruction for performing the control function and an expression explaining a direction or location for the control function. The expression explaining the direction or location for the control function may include, for example, an expression indicating an absolute direction based on the location of the target object or an absolute location (for example, space name) indicating fixed information of an area (or space) or an expression indicating a relative direction or a relative location based on the location relation with a neighboring object.

When the control function is identified, the instruction processing unit 290 may transmit an instruction related to the control function to the target object in operation 1650. For example, when the function-related expression includes the instruction for performing the control function, the instruction processing unit 290 may transmit a signal corresponding to the instruction to the target object. According to an embodiment, when the function-related expression includes the expression explaining the direction or location for the control function, the instruction processing unit 290 may transmit a signal corresponding to the instruction for performing the control function and the direction or location for the control function to the target object.

Figure 17A:
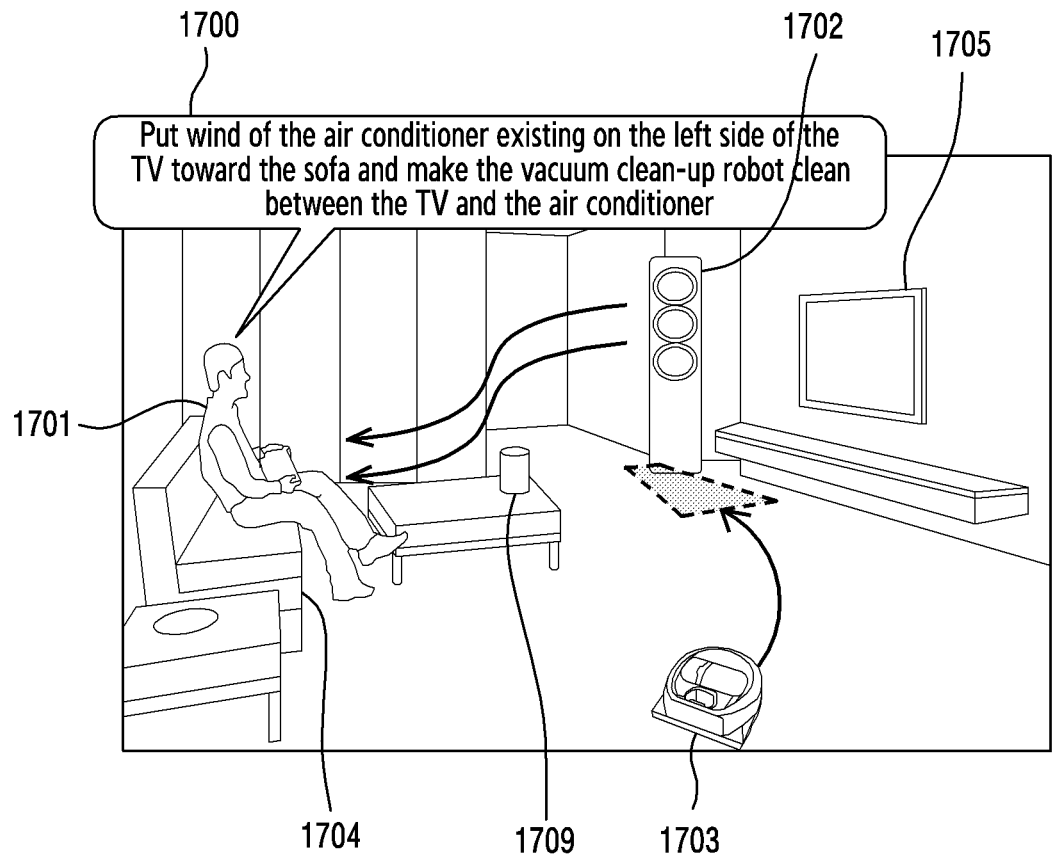
FIG. 17A is a diagram illustrating an example method of speaking a voice instruction for controlling a device based on the location relation between objects according to various embodiments of the disclosure.
Figure 17B:
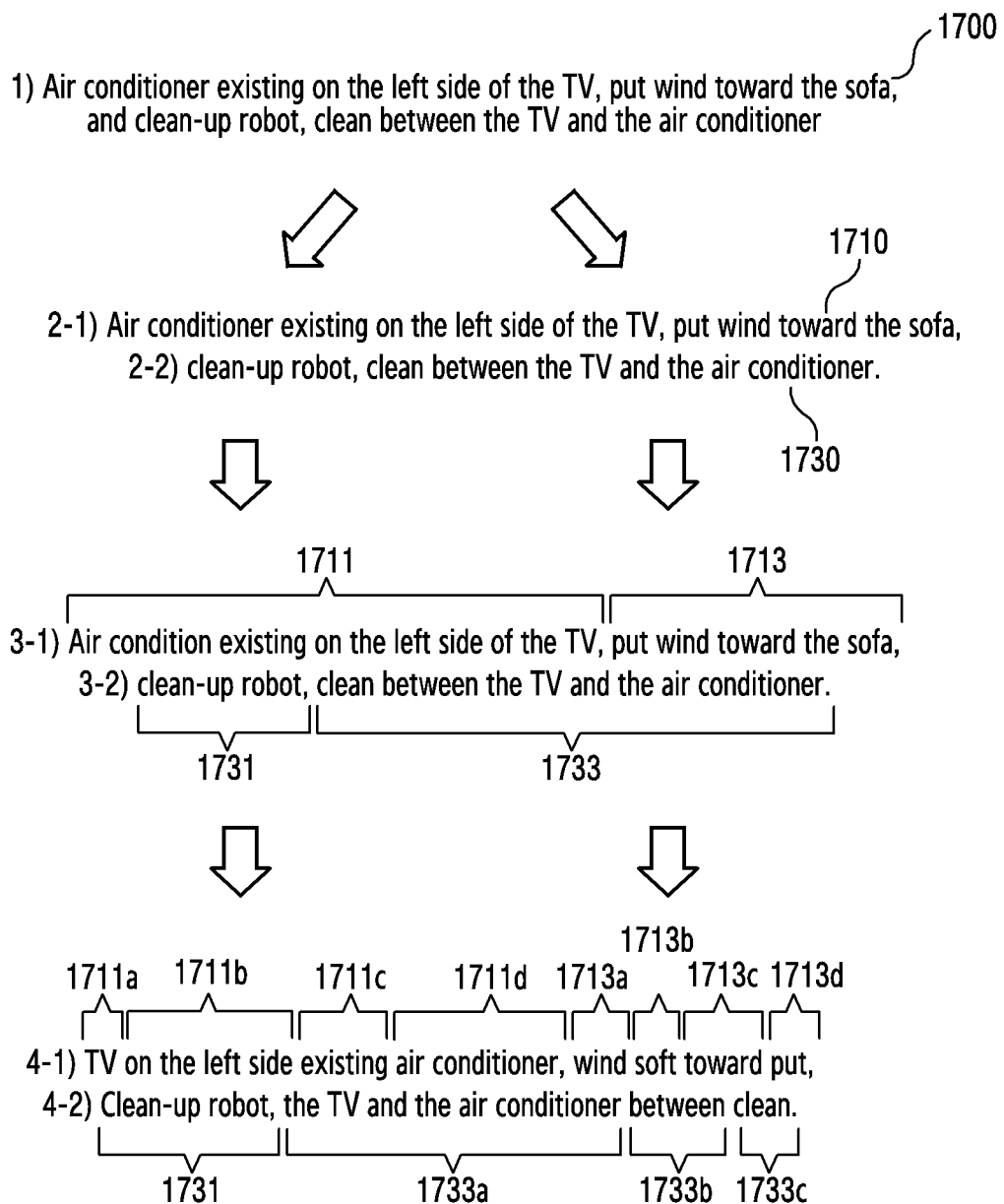
FIG. 17B is a diagram illustrating an example process for processing a voice instruction according to various embodiments of the disclosure.

FIG. 17A is a diagram illustrating an example method of speaking a voice instruction for controlling a device based on the location relation between objects according to various embodiments of the disclosure, and FIG. 17B is a diagram illustrating an example process for processing a voice instruction according to various embodiments of the disclosure.

Referring to FIGS. 17A and 17B, when a user 1701 speaks a voice instruction 1700, an electronic device 1709 (for example, the electronic device 101) including the control module 200 may receive the voice instruction 1700 of the user 1701 through a microphone and analyze the received voice instruction 1700. According to an embodiment, the instruction processing unit 290 of the control instruction 200 may convert the voice instruction into text data by performing voice recognition on the voice instruction 1700 and extract a name-related expression and a function-related expression from the text data.

According to an embodiment, the voice instruction 1700 may include a plurality of instructions. In this case, the instruction processing unit 290 may distinguish between the instructions in the text data converted from the voice instruction 1700. For example, as illustrated in FIG. 17B, first text data 1710 corresponding to a first instruction and second text data 1730 corresponding to a second instruction may be distinguished in the text data converted from the voice instruction 1700.

The instruction processing unit 290 may extract the name-related expression and the function-related expression from the text data corresponding to each instruction. For example, the instruction processing unit 290 may extract an expression 1711 related to a first name and an expression 1713 related to a first function from the first text data 1710 and extract an expression 1731 related to a second name and an expression 1733 related to a second function from the second text data 1730.

The instruction processing unit 290 may extract meaningful tagging information from the expressions 1711 and 1731 related to the names. For example, the instruction processing unit 290 may extract a name 1711d of a first target object 1702 (for example, "air conditioner") (and an expression additionally explaining the first target object (for example, "existing on the left side of the TV")) to perform the first function from the expression 1711 related to the first name and extract a name 1731 of a second target object 1703 (for example, "clean-up robot") (and an expression additionally explaining the second target object) to perform the second function from the expression 1730 related to the second name. FIG. 17B illustrates the state in which there is no expression additionally explaining the second target object 1703.

When there is the expression additionally explaining the target object, the instruction processing unit 290 may extract a name 1711*a* (for example, "TV") of the counterpart object, an expression 1711*b* (for example, "on the left side") indicating the location relation between the target object and the counterpart object, and an expression 1711*c* (for example, "existing") indicating a state from the expression additionally explaining the target object. Accordingly, the instruction processing unit 290 may identify the target object based on the location relation between the target object and the counterpart object.

The instruction processing unit 290 may extract meaningful tagging information from the expressions 1713 and 1733 related to the functions. For example, the instruction processing unit 290 may extract instructions 1713*a* and 1713*d* (for example, "wind" and "put") for performing the first function and expressions 1713*b* and 1713*c* (for example, "sofa" and "toward") explaining a direction or location for the first function from the expression 1713 related to the first function and extract an instruction 1733*c* (for example, "clean") for performing the second function and expressions 1733*a* and 1733*b* (for example, "the TV and the air conditioner" and "between") explaining a direction or location for the second function from the expression 1733 related to the second function.

The expression explaining the direction or location for the function may include, for example, an expression indicating an absolute direction based on the location of the object or an absolute location (for example, space name) indicting fixed information of an area (or space) or an expression indicating a relative direction or a relative location based on the location relation with a neighboring object. The expressions 1713*b* and 1713*c* explaining the direction or location for the first function indicate the state including the expression indicating a relative direction based on the location relation with a first counterpart object 1704 (for example, sofa), and the expressions 1733*a* and 1733*b* explaining the direction or location for the second function indicates the sate including the expression indicating the relative location based on the location relation with a second counterpart object 1705 (for example, TV) and a third counterpart object 1702 (for example, air conditioner). As described above, the instruction processing unit 290 may determine the direction or location for the function of the target object based on the location relation between the target object and the counterpart object.

As described above, according to various example embodiments, a method of controlling an external electronic device by an electronic device (for example, the electronic device 101) may include an operation of acquiring a voice instruction of a user through a microphone; performing voice recognition on the voice instruction, an operation of identifying an external electronic device to be controlled based on a name-related expression included in a result of the voice recognition, an operation of determining a direction or a location for a function of the external electronic device, based on a function-related expression included in the result of the voice recognition, and an operation of transmitting a signal related to the function of the external electronic device and the direction or the location for the function of the external electronic device to the external electronic device through a communication circuit.

According to various example embodiments, the method of controlling the external electronic device may further include an operation of acquiring first information related to types of a plurality of external electronic devices disposed within a specific space and second information related to locations of the plurality of external electronic devices in a first direction for the specific space, an operation of extracting names of the plurality of external electronic devices from the name-related expression, based on the first information, and an operation of extracting an expression indicating a relative location relation of the plurality of external electronic devices from the name-related expression, based on the second information.

According to various example embodiments, the method of controlling the external electronic device may further include an operation of determining a second direction in which a user views the specific space, an operation of correcting coordinate values of the plurality of external electronic devices included in the second information, based on a determination that the first direction and the second direction are substantially different from each other, and an operation of re-determining the location relation of the plurality of external electronic devices, based on the corrected coordinate values of the plurality of external electronic devices.

According to various example embodiments, the operation of correcting the coordinate values of the plurality of external electronic devices may include an operation of changing signs of an X axis coordinate value and a Z axis coordinate value in coordinate values of the plurality of external electronic devices included in the second information, based on a determination that the first direction and the second direction are substantially opposite to each other.

According to various example embodiments, the operation of correcting the coordinate values of the plurality of external electronic devices may include an operation of changing an X axis coordinate value to a Z axis coordinate value while changing a sign of the X axis coordinate value, and changing a Z axis coordinate value to an X axis coordinate value in coordinate values of the plurality of external electronic devices included in the second information, based on a determination that the second direction corresponds to a direction rotated about 90 degrees from the first direction in a clockwise direction.

According to various example embodiments, the operation of correcting the coordinate values of the plurality of external electronic devices may include an operation of changing an X axis coordinate value to a Z axis coordinate value and changing a Z axis coordinate value to an X axis coordinate value while changing a sign of the Z axis coordinate value in coordinate values of the plurality of external electronic devices included in the second information, based on a determination that the second direction corresponds to a direction rotated about 90 degrees from the first direction in a counterclockwise direction.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. One of ordinary skill in the art will understand that various changes in form and detail may be made without departing from the spirit and scope of the disclosure, including the appended claims and their equivalents.

What is claimed is:

1. An electronic device comprising:
   a communication circuit configured to communicate with an external electronic device;
   a processor operatively connected to the communication circuit; and
   a memory operatively connected to the processor,
   wherein, the memory is configured to store instructions which, when executed, cause the processor to control the electronic device to:
   acquire first information on types of a plurality of objects disposed within a first space and second information on locations of the plurality of objects in a first direction for the first space,
   select a target object to be named from among the plurality of objects,
   generate at least one first name of the target object based on information on a type of the target object in the first information,
   generate at least one second name of at least one counterpart object based on information on a type of the counterpart object disposed within a specified distance of the target object in the first information,
   determine a relative location relation between the target object and the at least one counterpart object based on the second information, and
   generate at least one third name of the target object based on the at least one first name, the at least one second name, and the relative location relation between the target object and the at least one counterpart object.

2. The electronic device of claim 1, wherein the instructions, when executed, cause the processor to control the electronic device to:
   acquire an image obtained by capturing the first space in the first direction from the external electronic device through the communication circuit, and acquire the first information and the second information by analyzing the image.

3. The electronic device of claim 1, further comprising a camera,
wherein the instructions, when executed, cause the processor to control the electronic device to:
acquire an image obtained by capturing the first space in the first direction through the camera, and
acquire the first information and the second information by analyzing the image.

4. The electronic device of claim 1, wherein the instructions, when executed, cause the processor to control the electronic device to:
determine a second direction in which a user views the first space,
based on the first direction and the second direction being substantially different from each other, based on the determined result, correct a coordinate value of the target object included in the second information and correct a coordinate value of the at least one counterpart object, and
re-determine the relative location relation between the target object and the at least one counterpart object based on the corrected coordinate value of the target object and the corrected coordinate value of the at least one counterpart object.

5. The electronic device of claim 4, wherein the instructions, when executed, cause the processor to control the electronic device to: based on it being determined that the first direction and the second direction are substantially opposite to each other, change signs of an X axis coordinate value and a Z axis coordinate value in the coordinate value of the target object and the coordinate value of the at least one counterpart object included in the second information, and correct the coordinate value of the target object and the coordinate value of the at least one counterpart object.

6. The electronic device of claim 4, wherein the instructions, when executed, cause the processor to control the electronic device to: based on it being determined that the second direction corresponds to a direction rotated about 90 degrees from the first direction in a clockwise direction, change an X axis coordinate value to a Z axis coordinate value while changing a sign of the X coordinate value and change a Z axis coordinate value to an X axis coordinate value in the coordinate value of the target object and the coordinate value of the at least one counterpart object included in the second information to correct the coordinate value of the target object and the coordinate value of the at least one counterpart object.

7. The electronic device of claim 4, wherein the instructions, when executed, cause the processor to control the electronic device to: based on it being determined that the second direction corresponds to a direction rotated about 90 degrees from the first direction in a counterclockwise direction, change an X axis coordinate value to a Z axis coordinate value and change a Z axis coordinate value to an X axis coordinate value while changing a sign of the Z axis coordinate value in the coordinate value of the target object and the coordinate value of the at least one counterpart object included in the second information to correct the coordinate value of the target object and the coordinate value of the at least one counterpart object.

8. The electronic device of claim 1, wherein the instructions, when executed, cause the processor to control the electronic device to transmit the at least one third name to the external electronic device through the communication circuit.

9. The electronic device of claim 1, further comprising a microphone,
wherein the instructions, when executed, cause the processor to control the electronic device to:
acquire a voice instruction through the microphone,
perform voice recognition on the voice instruction,
identify the target object based on a name-related expression included in a result of the voice recognition,
determine a direction or a location to perform a function of the target object based on a function-related expression included in the result of the voice recognition, and
transmit a signal related to the function of the target object and the direction or the location to perform the function of the target object to the target object through the communication circuit.

10. An electronic device comprising:
a camera:
a communication circuit;
a processor operatively connected to the camera and the communication circuit; and
a memory operatively connected to the processor,
wherein, the memory is configured to store instructions which, when executed, cause the processor to control the electronic device to:
acquire a first image related to a first space in which at least one external electronic device is disposed through the camera or the communication circuit,
acquire first information related to a type of the at least one external electronic device disposed within the first space and second information related to a location of the at least one external electronic device in a first direction for the first space by analyzing the first image,
generate a first name of the at least one external electronic device based on the first information,
determine a location relation between the electronic device and the at least one external electronic device based on the second information, and
generate a name of the at least one external electronic device based on the first name of the at least one external electronic device, and the location relation between the electronic device and the at least one external electronic device.

11. The electronic device of claim 10, wherein the instructions, when executed, cause the processor to control the electronic device to:
acquire a second image including a user through the camera or the communication circuit,
determine a second direction in which the user views the first space by analyzing the second image, and
correct a location relation of the at least one external electronic device included in the second information based on the first direction and the second direction being substantially different from each other, based on a result of the determination.

12. The electronic device of claim 11, wherein the instructions, when executed, cause the processor to control the electronic device to: based on the first direction and the second direction being substantially opposite to each other, based on the result of the determination, change signs of an X axis coordinate value and a Z axis coordinate value in a coordinate value of the at least one external electronic device included in the second information to correct the location relation of the at least one external electronic device.

13. The electronic device of claim 11, wherein the instructions, when executed, cause the processor to control the electronic device to: based on the second direction being rotated about 90 degrees from the first direction in a clockwise direction, based on the result of the determination, change an X axis coordinate value to a Z axis coordinate value while changing a sign of the X coordinate value and change a Z axis coordinate value to an X axis coordinate value object in a coordinate value of the at least one external electronic device included in the second information to correct the location relation of the at least one external electronic device.

14. The electronic device of claim 11, wherein the instructions, when executed, cause the processor to control the electronic device to: based on the second direction being rotated about 90 degrees from the first direction in a counterclockwise direction, based on the result of the determination, change an X axis coordinate value to a Z axis coordinate value and change a Z axis coordinate value to an X axis coordinate value while changing a sign of the Z axis coordinate value in a coordinate value of the at least one external electronic device included in the second information to correct the location relation of the at least one external electronic device.

15. A method of controlling an external electronic device by an electronic device, the method comprising:
acquiring a voice instruction through a microphone;
performing voice recognition on the voice instruction;
obtaining first information related to types of a plurality of external electronic devices disposed within a specific space and second information related to locations of the plurality of external electronic devices in a first direction for the specific space;
identifying an external electronic device to be controlled based on a name-related expression included in a result of the voice recognition, the first information or the second information;
determining a direction or a location for a function of the external electronic device based on a function-related expression included in the result of the voice recognition;
transmitting a signal related to the function of the external electronic device and the direction or the location for the function of the external electronic device to the external electronic device through a communication circuit.

16. The method of claim 15, further comprising:
extracting names of the plurality of external electronic devices from the name-related expression based on the first information; and
extracting an expression indicating a relative location relation of the plurality of external electronic devices from the name-related expression based on the second information.

17. The method of claim 16, further comprising:
determining a second direction in which a user views the specific space;
correcting coordinate values of the plurality of external electronic devices included in the second information based on a determination that the first direction and the second direction are substantially different from each other; and
re-determining the location relation of the plurality of external electronic devices based on the corrected coordinate values of the plurality of external electronic devices.

18. The method of claim 17, wherein the correcting of the coordinate values of the plurality of external electronic devices comprises changing signs of an X axis coordinate value and a Z axis coordinate value in coordinate values of the plurality of external electronic devices included in the second information based on a determination that the first direction and the second direction are substantially opposite to each other.

19. The method of claim 17, wherein the correcting of the coordinate values of the plurality of external electronic devices comprises changing an X axis coordinate value to a Z axis coordinate value while changing a sign of the X axis coordinate value, and changing a Z axis coordinate value to an X axis coordinate value in coordinate values of the plurality of external electronic devices included in the second information based on a determination that the second direction corresponds to a direction rotated about 90 degrees from the first direction in a clockwise direction.

20. The method of claim 17, wherein the correcting of the coordinate values of the plurality of external electronic devices comprises changing an X axis coordinate value to a Z axis coordinate value and changing a Z axis coordinate value to an X axis coordinate value while changing a sign of the Z axis coordinate value in coordinate values of the plurality of external electronic devices included in the second information based on a determination that the second direction corresponds to a direction rotated about 90 degrees from the first direction in a counterclockwise direction.

* * * * *